United States Patent [19]

Ueda

[11] Patent Number: 5,692,179
[45] Date of Patent: Nov. 25, 1997

[54] INFORMATION RETRIEVING APPARATUS

[75] Inventor: Toru Ueda, Ichihara, Japan

[73] Assignee: Sharp Kabushiki Kaisha, Osaka, Japan

[21] Appl. No.: 389,806

[22] Filed: Feb. 16, 1995

[30] Foreign Application Priority Data

Apr. 22, 1994 [JP] Japan .................. 6-085073

[51] Int. Cl.$^6$ .................................. G06F 3/14
[52] U.S. Cl. ............................. 395/609; 395/615
[58] Field of Search ..................... 395/600, 700, 395/161, 601, 608, 609, 610, 611, 612, 613, 614, 615, 616; 364/401 R

[56] References Cited

U.S. PATENT DOCUMENTS

| | | | |
|---|---|---|---|
| 5,032,979 | 7/1991 | Hecht et al. | 364/280 |
| 5,301,270 | 4/1994 | Steinberg et al. | 395/161 |
| 5,406,475 | 4/1995 | Kouchi et al. | 364/401 R |
| 5,475,833 | 12/1995 | Dauerer et al. | 395/600 |
| 5,506,986 | 4/1996 | Healy | 395/600 |
| 5,560,005 | 9/1996 | Hoover et al. | 395/600 |

FOREIGN PATENT DOCUMENTS

| | | |
|---|---|---|
| 205020 | 12/1986 | European Pat. Off. . |
| 5165780 | 4/1993 | Japan . |
| 5314179 | 11/1993 | Japan . |

*Primary Examiner*—Thomas G. Black
*Assistant Examiner*—Ruay Lian Ho

[57] ABSTRACT

An information retrieving apparatus has a retrieving section, a security judging section and an input/display section. The retrieving section retrieves whether or not the security level of an inquirer is registered to a security DB section with respect to a retrieving request of retrieved data. When this security level of the inquirer is registered, the retrieving section retrieves retrieved data and a security level of the retrieved data stored to a data memory section. The security judging section judges whether the security level of the inquirer and the security level of the retrieved data are in conformity with each other or not. The input/display section displays the retrieving request, an inquirer's name, etc. when no security level of the inquirer is registered to the security DB section with respect to the retrieving request of desirable retrieved data. The input/display section can additionally store the security level of the inquirer to the security DB section.

17 Claims, 27 Drawing Sheets

FIG. 5

Received a material request of "About a research plan of a communication system" from Mr. Yamashita (development section) at 14:23 January 25, '94.   ]101 ]100

In materials at hand, there are 1) a research plan of the communication system for three years 2) a supplementary explanation document of the research plan of the communication system 3) a written opinion with respect to the research plan of the communication system.

No reference to these materials can be made at a security level of Mr. Yamashita.

May these materials be sent ?

YES   ]103

Understand.

Send materials of 1) 2) and 3) to Mr. Yamashita.

FIG. 7

Received a material request of "About a research plan of a communication system" from Mr. Yamashita (development section) at 14:23 January 25, '94. ⊐101  ]100

In materials at hand, there are 1) a research plan of the communication system for three years 2) a supplementary explanation document of the research plan of the communication system     |102

3) a written opinion with respect to the research plan of the communication system.

May these materials be sent ?

YES     ⊐103

Understand.

Send materials of 1) 2) and 3) to Mr. Yamashita.

Mr. Yamashita can refer to files in importance degree 2 of company materials and importance degree 0 of individual materials at present. The materials sent at present are materials in company importance degree 3. Is the security level of Mr. Yamashita updated to automatically refer to these materials ?

YES

The security level of Mr. yamashita has been updated.

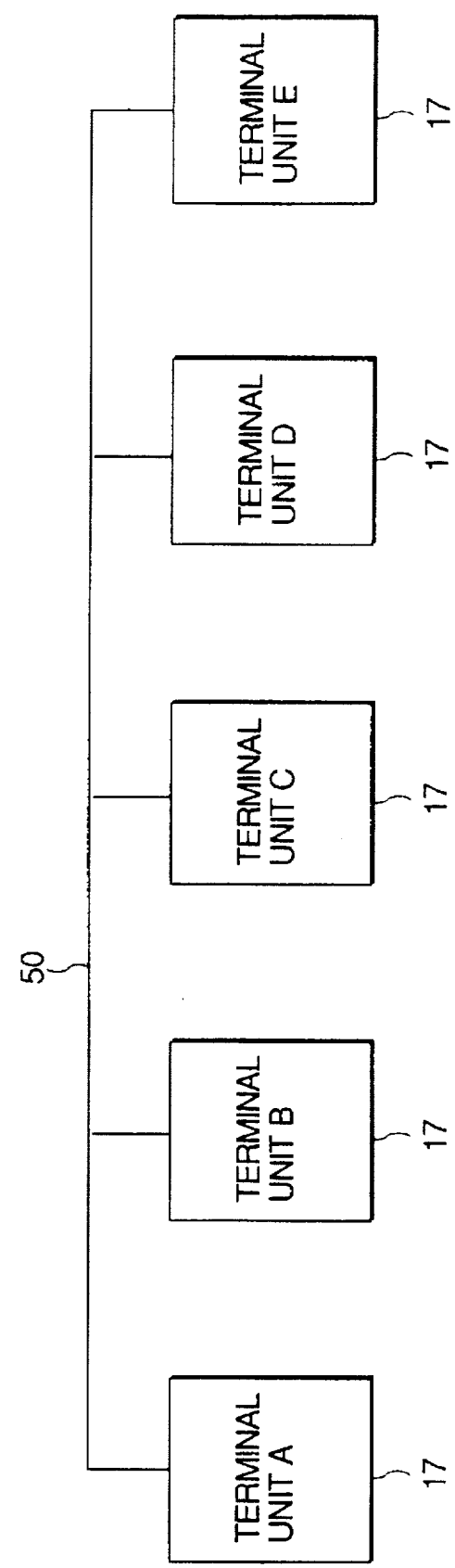

FIG. 16 some time ago yesterday the day before yesterday a few days ago four or five days ago XX-day of the week last week XX-day of last week Y-weeks ago last month last year

FIG. 17

| yesterday | date=NOWDATE-1 |
|---|---|
| a few days ago | NOWDATE-3<=date<=NOWDATE-2 |
| one week ago | NOWDATE-8<=date<=NOWDATE-6 |
| last month | month=NOWMONTH-1 |
| last year | year=NOWYEAR-1 |
| years ago | NOWYEAR-3<=year<=NOWYEAR-2 |
| spring | 3<=month<=6<br>if NOWMONTH<=3 then<br>year=NOWYEAR-1 |
| summer | 6<=month<=9<br>if NOWMONTH<=6 then<br>year=NOWYEAR-1 |
| autumn | 9<=month<=12<br>if NOWMONTH<=9 then<br>year=NOWYEAR-1 |
| winter | 12.(NOWYEAR 1)<=month year<=3.(NOWYEAR) |

```
year        year of retrieving object
month       month of retrieving object
date        date of retrieving object
              relative display from reference date
NOWYEAR     retrieving year
NOWMONTH    retrieving month
month.year  month and year of retrieving object
```

FIG. 21

The present date is January 24, 1994.
What item do you retrieve ?
<u>image / processing/ chip</u>
Materials about what time ?
<u>autumn last year</u>

Then,
    retrieval is made with respect to materials
in autumn last year ( from September 1 , 1993 to
December 31 , 1993 ) about image / processing / chip.

No corresponding materials can have been found.

Is retrieving period extended ?
<u>YES</u>
Then,
    retrieval is made by extending the retrieving
period from July 14 , 1993 to January 7 , 1994.

The following materials heve been found.
    1) parallel image processing chips of X
corporation
    2) a board list of parallel image processing
of each company Is retrieval continued ?
<u>NO</u>
Thank you.

INFORMATION RETRIEVING APPARATUS

BACKGROUND OF THE INVENTION

1. Field of the Invention

The present invention relates to an information retrieving apparatus such as an electronic pocket notebook, a portable type information terminal, a word processor, etc. connected to a network and judging the security level of an inquirer to protect data.

2. Description of the Related Art

In a retrieving apparatus for performing a retrieving operation through a network, information is generally transmitted to only an allowed person to prevent the information from being leaked by illegal access by collating a security level accompanied with individual data with a security data base to which the security level of an inquirer is registered. It is generally necessary to register information of the inquirer in advance to the security data base. When no inquirer registers this information, only an unretrievable message is replied to the inquirer through the network. In this case, it is supposed that the data base is constructed by many users and a small number of managers and the users are fixedly provided and a person once registered often gets access to the retrieving apparatus.

For example, the above retrieving apparatus is shown by Japanese Patent Application Laying Open (KOKAI) No. 5-165780. FIG. 22 shows an administrative data base retrieving system shown in this Japanese Patent Application Laying Open (KOKAI) No. 5-165780. As shown in FIG. 22, when a terminal unit 1 retrieves an administrative data base 8 in a time-sharing system (TSS) 3 via a public line network 2, the following secret holding functions at three stages are fulfilled so that usage of a proper data base is guaranteed and it is possible to protect a file of another data base in the time-sharing system from being illegally accessed. A protecting function at a first stage is a user limiting function 4. In this user limiting function 4, when a user of the TSS declares a user's name in starting of usage of the TSS, it is checked whether or not this user is a guest user allowed with respect to only retrieval of the data base when this user is a user via the public communication line network 2. When the guest user is declared, the usage of the TSS can be allowed. In contrast to this, when a user except for the guest user is declared, the usage of the TSS is rejected. Accordingly, a user except for guest users is excluded at this stage when the names of users having rights except for the data base retrieval are externally leaked for some reasons and are used with evil intent via a public communication line.

A protecting function at a second stage is a systematic managing control function 5. A user passing through the user limiting function 4 is checked in this systematic managing control function 5. A systematic manager can exercise all rights possessed in a computer system so that a user except for the guest users can pass only once through the check of the user limiting function 4. Therefore, when systematic manager's names are externally leaked and used with evil intent, serious situations such as destruction of the data base, destruction of the computer system, etc. are caused. To prevent such situations, usage of the TSS is rejected by the systematic managing control function 5 when usage except for usage of a control terminal unit 9 is declared by management of the computer system.

A protecting function at a third stage is a command control function 6. In this command control function 6, usable commands are checked with respect to a user allowed to use TSS. These commands are checked every the user issues these commands. Only a retrieving command of the administrative data base is allowed with respect to a guest user via the public communication line network 2. Accordingly, execution of an updating command is rejected when destruction of the data base is tried by using the updating command. Therefore, the computer system is safely protected.

When information stored to a device connected to the network is retrieved, a method for simultaneously outputting a retrieving request to plural connecting devices or a method for outputting the retrieving request from these connecting devices one by one and waiting for a reply is used to perform retrieving operations in parallel with each other. For example, Japanese Patent Application Laying Open (KOKAI) No. 5-314179 shows a data retrieving processing method of a distributed type data base. In this data retrieving processing method, when plural retrieving processing requests simultaneously overlap each other with respect to a data base of one node, a waiting time for processing the retrieving processing requests with respect to this data base can be reduced to the utmost.

A date is designated in a retrieving range in the general retrieval by a year, a month and a day of the Christian Era (A.D.) such as Jan. 1, 1994.

In the general retrieving apparatus shown in FIG. 22, it is necessary to register all users in advance before inquiry and it takes time to register these users. Therefore, no users can retrieve information while the users are registered. In particular, when the retrieving apparatus is constructed by a portable information terminal, it is considered that the portable information terminal receives many inquiries from various kinds of persons in each of places in which the portable information terminal is carried. According, no portable information terminal can be used unless all users are registered in advance.

In the data retrieving processing method shown in the above Japanese Patent Application Laying Open (KOKAI) No. 5-314179, there is a case in which retrieved results are obtained by succeeding in retrieval in any one of retrieving apparatuses and no retrieving operation is further required. However, such information is not transmitted to the other retrieving apparatuses and the retrieving operation is continuously performed in each of the other retrieving apparatuses so that operating efficiency is bad. Further, in the general example of a retrieving apparatus, communication in real time is supposed so that no delay caused in this communication is considered. When a portable information tool is used in the data base, a communication path of this portable information tool is not necessarily secured at any time. For example, when a wireless local area network is used as a communicating means, no data of a portable information tool of a user can be accessed if this user goes out. In this case, this user receives a retrieving request when this user returns to an office having the portable information tool. In such a situation, no data information can be efficiently processed since retrieving requests are simultaneously issued and the retrieving apparatus waits on until all data have been retrieved.

As mentioned above, a date is designated in a retrieving range in the general retrieving apparatus by a year, a month and a day of the Christian Era (A.D.) such as Jan. 1, 1994. Accordingly, there is date information which can be approximately remembered but cannot be accurately remembered in a certain kind of retrieval. In this case, no expressions such as "yesterday", "a few years ago", etc. can be used in designation of this date. Therefore, the date must be designated by a year, a month and a day of the Christian Era (A.D.) so that it is troublesome and complicated to designate this date. Further, for example, there are often cases of errors in memory such as a case in which a remembered date is a few years ago, but a real retrieved object is an event of four years ago.

SUMMARY OF THE INVENTION

It is therefore a first object of the present invention to provide an information retrieving apparatus capable of instantly registering the security level of an inquirer unregistered to a security data base in advance when there is an inquiry from this inquirer.

A second object of the present invention is to provide an information retrieving apparatus capable of rejecting a retrieving request which becomes meaningless.

A third object of the present invention is to provide an information retrieving apparatus capable of interpreting a relative date expression.

In accordance with a first construction of the present invention, the above first object can be achieved by an information retrieving apparatus comprising data memory means for holding retrieved data and a security level of the retrieved data; data base means for registering the security level of an inquirer; input display means capable of adding the security level of the inquirer to the security data base means by a data holder when no security level of the inquirer is registered to the security data base means; retrieving means for retrieving the retrieved data stored to the data memory means; and judging means for judging whether the security level of the inquirer and the security level of the retrieved data are in conformity with each other or not.

The above first object can be also achieved by a second construction of the present invention. In the second construction, the information retrieving apparatus having the first construction further comprises buffer means for temporarily storing retrieved results of the retrieved data when the security level of the inquirer and the security level of the retrieved data are in conformity with each other; and network means for communicating a retrieving request and the retrieved results through a network.

In accordance with a third construction of the present invention, the above first object can be also achieved by an information retrieving apparatus comprising data base means for storing the security level of an inquirer; signal receiving means for receiving a retrieving request from the inquirer through a network; retrieving means for retrieving data required in the retrieving request; judging means for comparing a security level of retrieved results with the security level of the inquirer and judging whether the retrieved results are data accessible by the inquirer; and input display means for making a data holder able to get access to the retrieved results when it is judged that no retrieved results can be accessed.

The above first object can be also achieved by a fourth construction of the present invention. In the fourth construction, the input display means has registering means for registering ID and the security level of the inquirer to the data base means.

In accordance with a fifth construction of the present invention, the above second object can be achieved by an information retrieving apparatus comprising signal receiving means for receiving a retrieving request from an inquirer through a network; retrieving means for retrieving data required in the retrieving request; requiring means for receiving retrieved results through the network and transmitting a canceling request to an information retrieving apparatus from which no reply is transmitted when a predetermined condition is satisfied; and canceling means for deleting the retrieving request when the canceling request is transmitted.

The above second object can be also achieved by a sixth construction of the present invention. In the sixth construction, the predetermined condition includes a predetermined number of replies.

The above second object can be also achieved by a seventh construction of the present invention. In the seventh construction, the information retrieving apparatus having the fifth construction further comprises setting means for setting a starting time of retrieval; and timer means for delaying the retrieval until the starting time set by the setting means.

The above second object can be also achieved by an eighth construction of the present invention. In the eighth construction, the information retrieving apparatus having the fifth construction further comprises time means for setting an effective time of the retrieving request; and the canceling means deletes the retrieving request when a generating time of the retrieving request passes the effective time.

In accordance with a ninth construction of the present invention, the above third object can be achieved by an information retrieving apparatus comprising input means for inputting a retrieving request; rule memory means for storing a rule for interpreting a relative date expression into an absolute date expression; interpreting means for interpreting the relative date expression in the retrieving request into the absolute date expression on the basis of the rule stored to the rule memory means; data memory means for holding retrieved data; retrieving means for performing a retrieving operation with respect to the retrieving request; buffer means for temporarily holding retrieved results; and display means for displaying the retrieved results.

The above third object can be also achieved by a tenth construction of the present invention. In the tenth construction, the information retrieving apparatus having the ninth construction further comprises extending means for extending the range of a date.

The above third object can be also achieved by an eleventh construction of the present invention. In the eleventh construction, the extending means extends the date range on the basis of a date difference from the present date.

In the first construction of the information retrieving apparatus, the retrieved data and the security level thereof are held by the data memory means. The security level of the inquirer is stored to the data base means. A first retrieving means retrieves whether or not the security level of the inquirer is registered to the data base means with respect to a retrieving request of desirable retrieved data from a terminal unit connected to a network of a public communication line, etc. When the security level of the inquirer is registered, the retrieved data and the security level thereof stored to the data memory means are retrieved. The judging means judges whether the security level of the inquirer and the security level of the retrieved data are in conformity with each other or not. When the security level of the inquirer and the security level of the retrieved data are in conformity with each other, retrieved results of the retrieved data are temporarily stored to the buffer means and are transmitted to a terminal on an inquirer side through the network. The input display means displays the retrieving request, an inquirer's name, etc. when no security level of the inquirer is registered to the data base means with respect to the retrieving request of the desirable retrieved data from the terminal unit connected to the network of a public communication line, etc. Further, the security level of the inquirer is additionally stored to the data base means. Accordingly, time and labor for making a security data base by predicting the inquirer in advance can be omitted.

In the second construction of the information retrieving apparatus, the buffer means temporarily stores the retrieved results of the retrieved data when the security level of the inquirer and the security level of the retrieved data are in conformity with each other. The network means communicates the retrieving request and the retrieved results through the network. Accordingly, time and labor for making a security data base by predicting the inquirer in advance can be omitted.

In the third construction of the present invention, the data base means stores the security level of an inquirer. The signal receiving means receives a retrieving request from the inquirer through a network. The retrieving means retrieves data required in the retrieving request. The judging means compares a security level of retrieved results with the security level of the inquirer and judges whether the retrieved results are data accessible by the inquirer. The input display means makes a data holder able to get access to the retrieved results when it is judged that no retrieved results can be accessed. Accordingly, time and labor for making a security data base by predicting the inquirer in advance can be omitted.

In the fourth construction of the present invention, the data base means stores the security level of an inquirer. The signal receiving means receives a retrieving request from the inquirer through a network. The retrieving means retrieves data required in the retrieving request. The judging means compares a security level of retrieved results with the security level of the inquirer and judges whether the retrieved results are data accessible by the inquirer. The input display means makes a data holder able to get access to the retrieved results when it is judged that no retrieved results can be accessed. Further, identification data (ID) and the security level of the inquirer are registered to the data base means. Accordingly, a security level suitable for the inquirer is registered to the security data base by only allowing transmission of the retrieved results without registering this security level to the security data base in advance.

In the fifth construction of the information retrieving apparatus, retrieval/question contents are inputted to a terminal unit on a signal transmitting side by an input means. A retrieving request is communicated by a network means to a plurality of terminal units on a signal receiving side through a network. Each of the terminal units on the signal receiving side temporarily holds the retrieving request by an inputting buffer means. The retrieving means performs a retrieving operation with respect to an input of the retrieving request. A display means displays an inputting situation, a retrieving situation, retrieved results, etc. The retrieved results are transmitted from each of the terminal units on the signal receiving side to the terminal unit on the signal transmitting side through the network. When a predetermined condition is satisfied, cancel of the retrieving request is transmitted from the terminal unit on the signal transmitting side to a terminal unit on the signal receiving side transmitting no reply. A retrieving request corresponding to this request is deleted by a retrieval canceling means of the terminal unit on the signal receiving side receiving the cancel of the retrieving request. Accordingly, using efficiency of the information retrieving apparatus can be improved. Further, no unnecessary retrieved results are transmitted so that utilizing efficiency of the network is improved.

In the sixth construction of the information retrieving apparatus, it is possible to automatically cancel a retrieving request in which no reply is obtained if a predetermined number of replies can be obtained.

In the seventh construction of the information retrieving apparatus, the setting means sets a starting time of retrieval. The timer means delays this retrieval until the starting time set by the setting means. Accordingly, the retrieving request is issued by shifting retrieving times from each other so that overlapping retrievals can be reduced to the utmost.

In the eighth construction of the information retrieving apparatus, the above information retrieving apparatus having the fifth construction further has time means for setting an effective time of the retrieving request. The canceling means deletes the retrieving request when a generating time of the retrieving request passes the effective time. Accordingly, the retrieving request is issued by designating the retrieving effective time. Therefore, the information retrieving apparatus can be set such that no retrieving operation is performed with respect to the retrieving request already meaningless after the effective time has passed.

In the ninth construction of the information retrieving apparatus, a retrieving request is inputted to a terminal unit on a signal transmitting side by the input means and is communicated to a terminal unit on a signal receiving side through a network. In the terminal unit on the signal receiving side, the rule memory means stores a rule for interpreting words relative to a date. The date interpreting means converts a relative date within the retrieving request to a date of the Christian Era on the basis of the rule and interprets the converted date. The retrieving means retrieves information conforming to the retrieving request from data stored to the data memory means on the basis of the date interpreted by the date interpreting means. Accordingly, the relative date can be designated so that operability of the information retrieving apparatus is further improved.

In the tenth construction of the information retrieving apparatus, the extending means extends the range of a retrieving date. Accordingly, the range of a date tending to be inaccurately provided is widened so that a retrieving success percentage of the information retrieving apparatus is improved.

In the eleventh construction of the information retrieving apparatus, the extending means extends the range of a retrieving date on the basis of a date difference from the present date. Accordingly, it is possible to perform a retrieving operation suitable for man's characteristics in which a man's memory is more accurate at a time closer to the present time and is more inaccurate at a time remoter from the present time.

Further objects and advantages of the present invention will be apparent from the following description of the preferred embodiments of the present invention as illustrated in the accompanying drawings.

7

Figure 3:
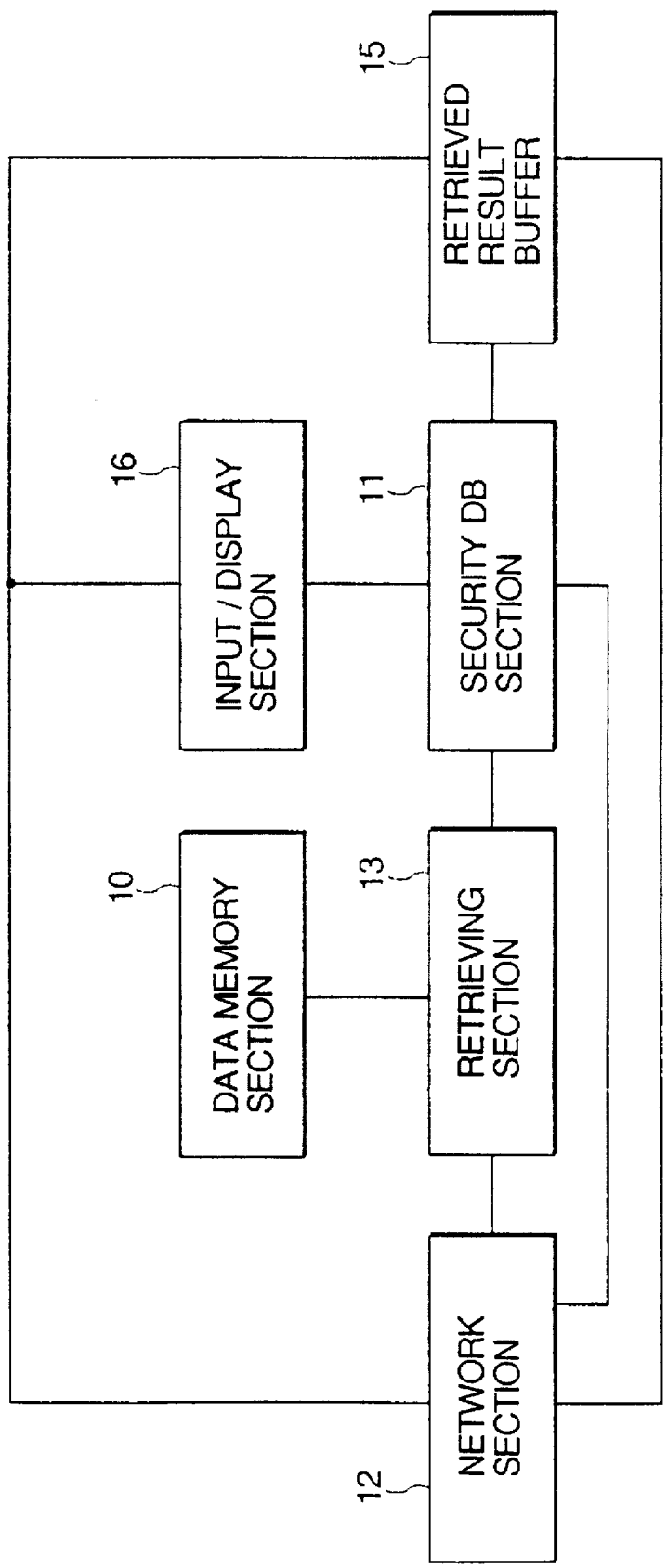
Figure 4:
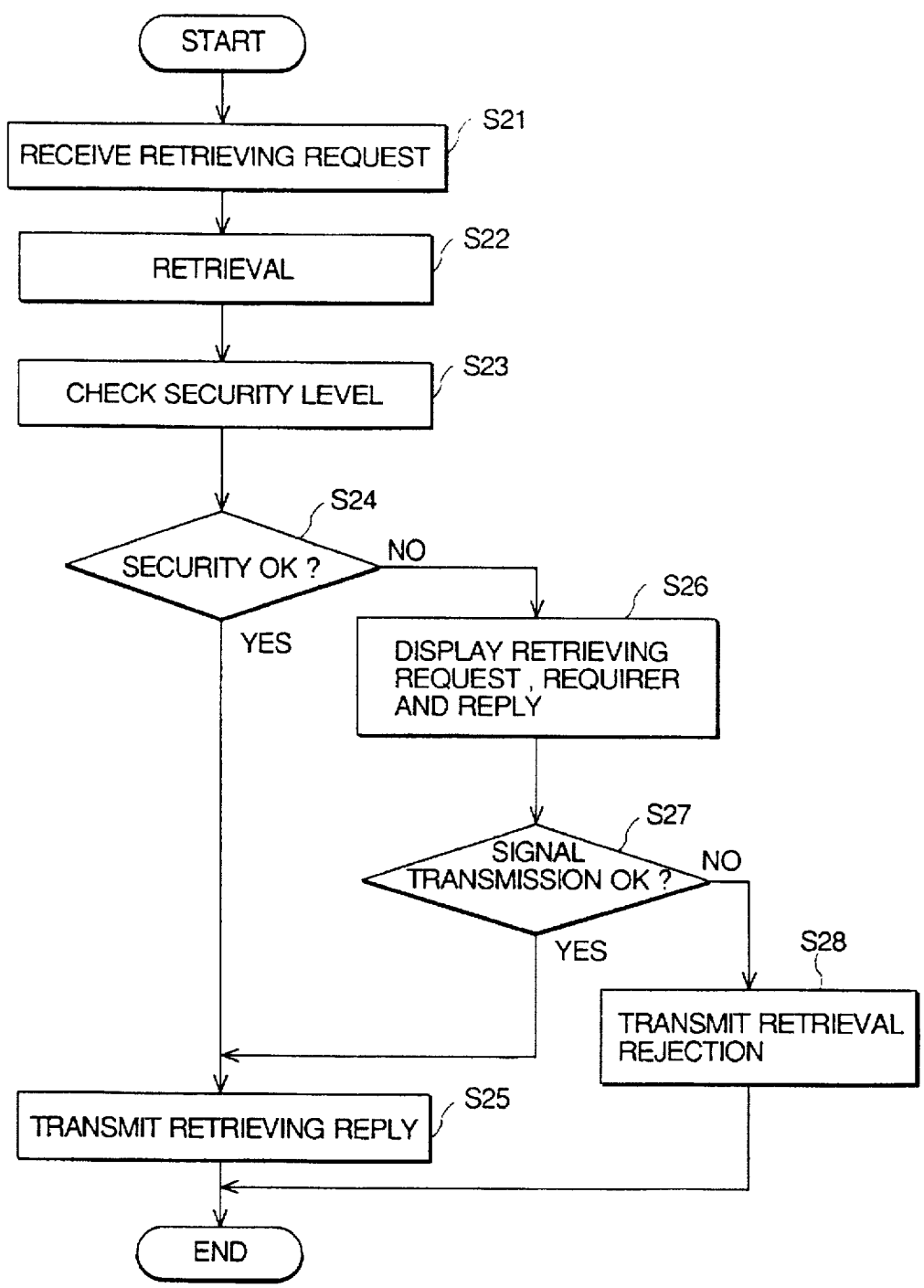
Figure 6:
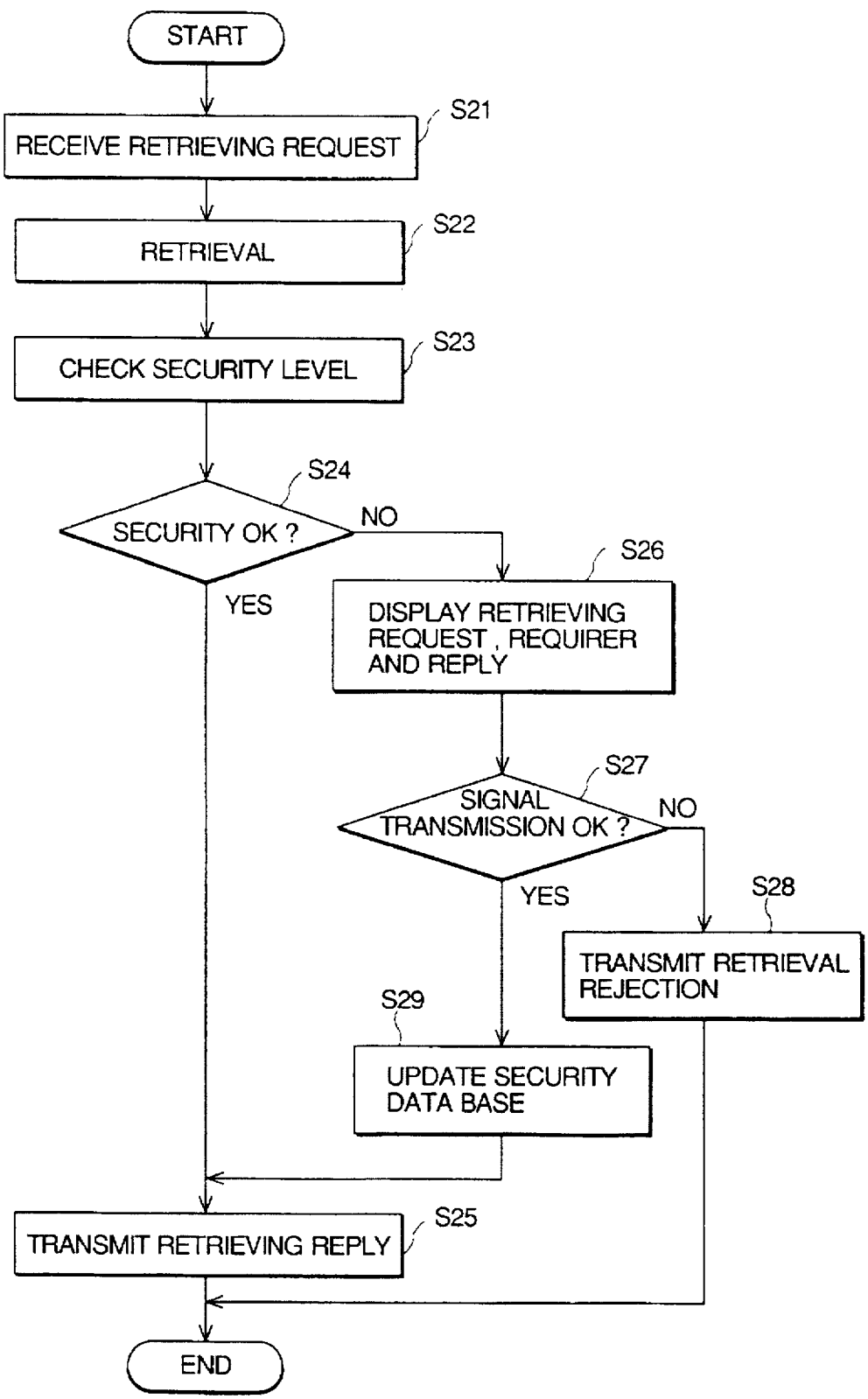
Figure 8B:
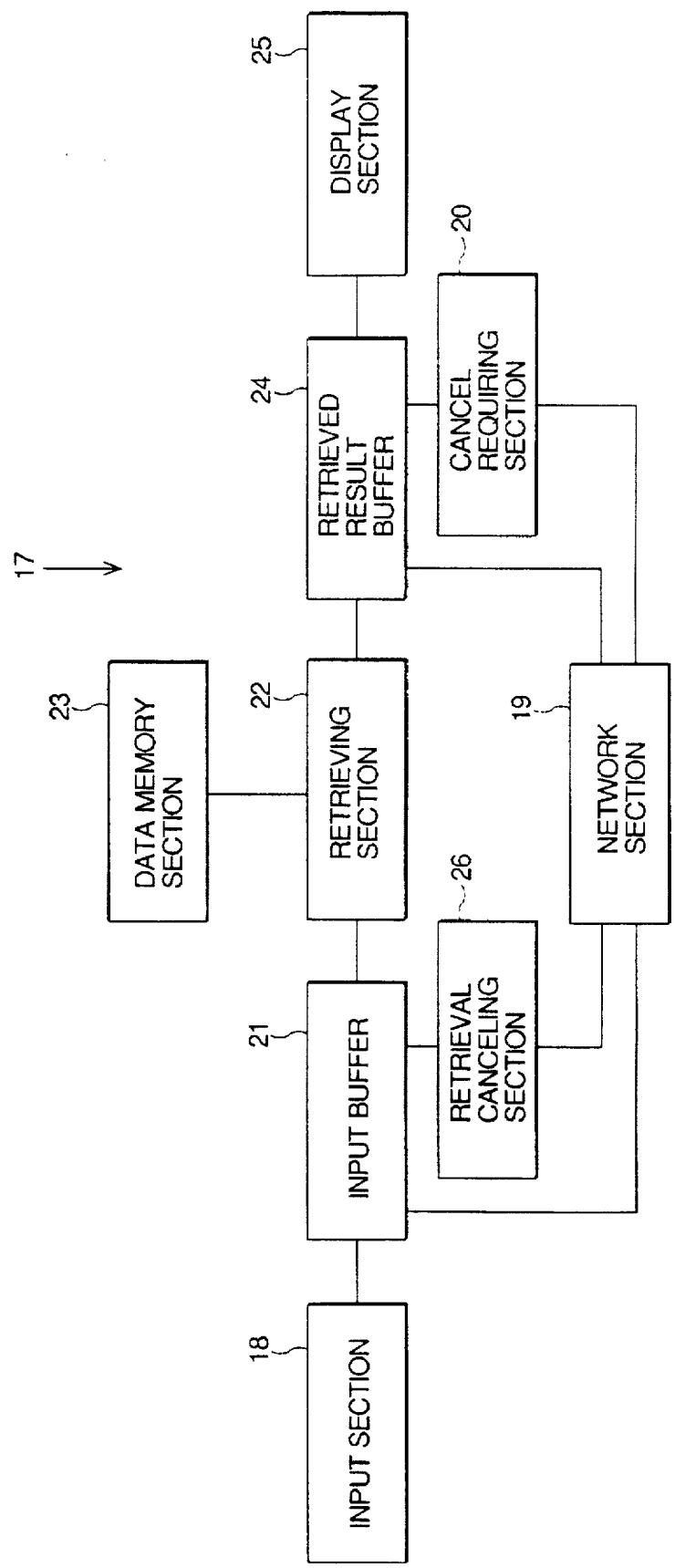
Figure 9:
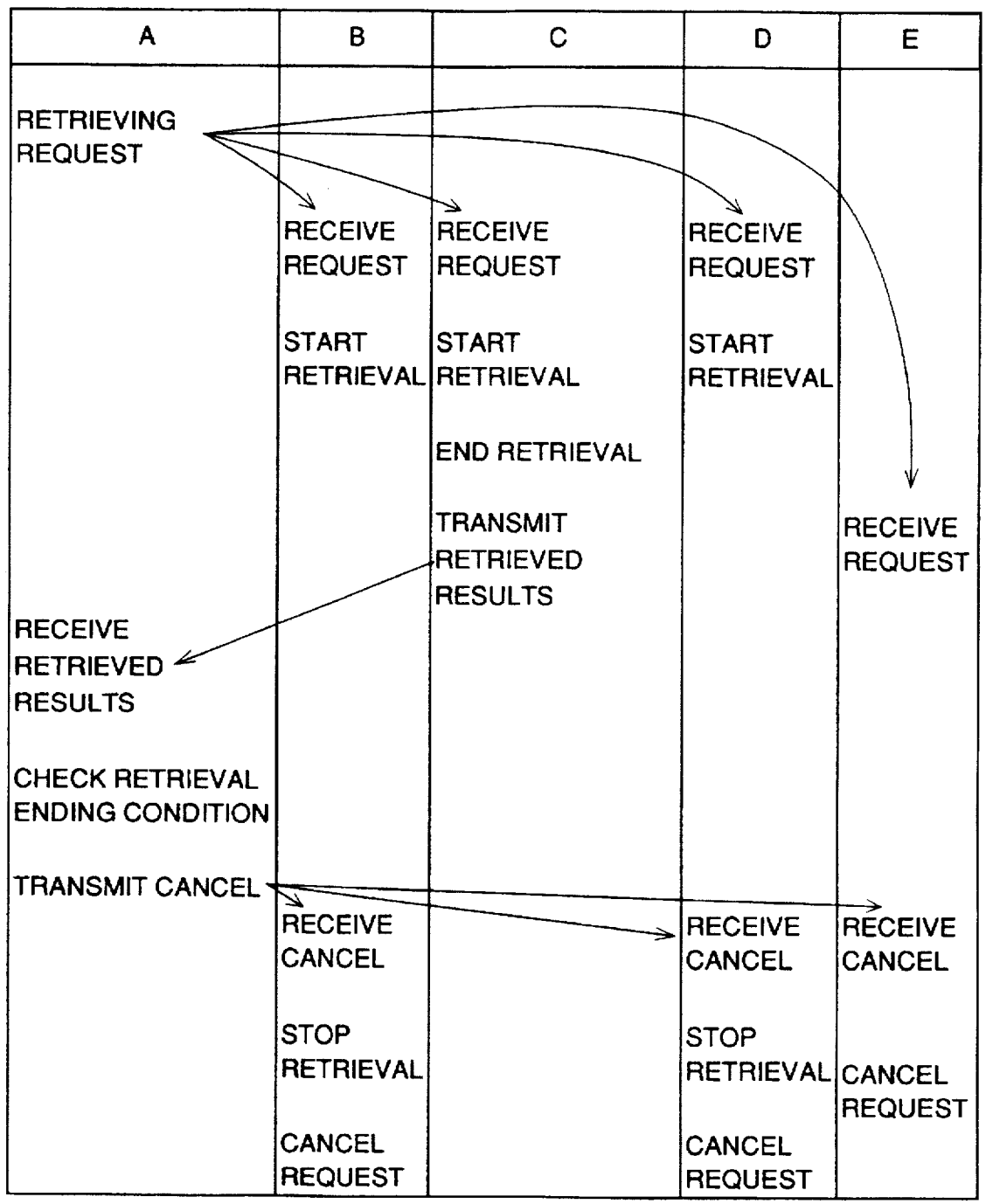
Figure 10A:
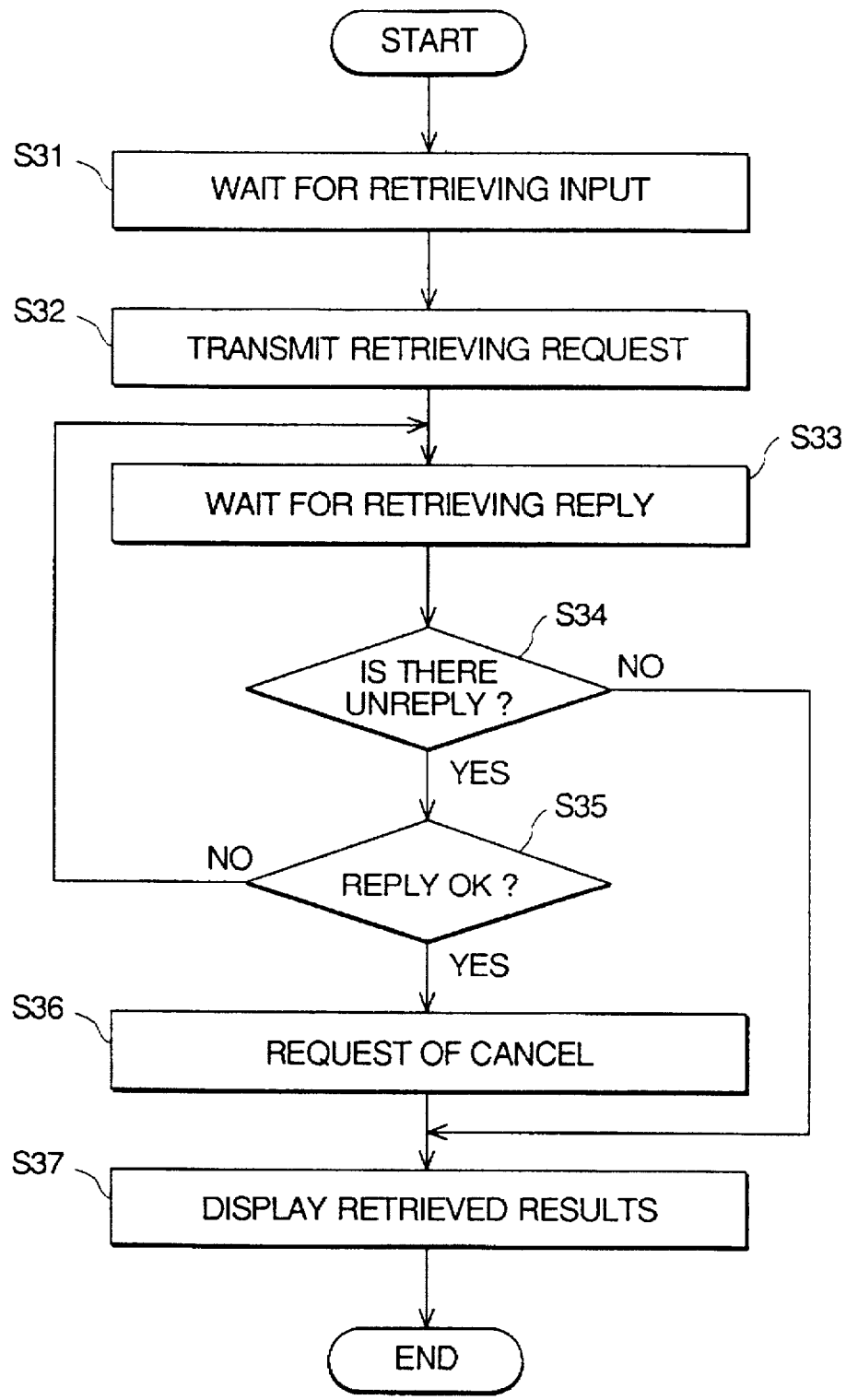
Figure 10B:
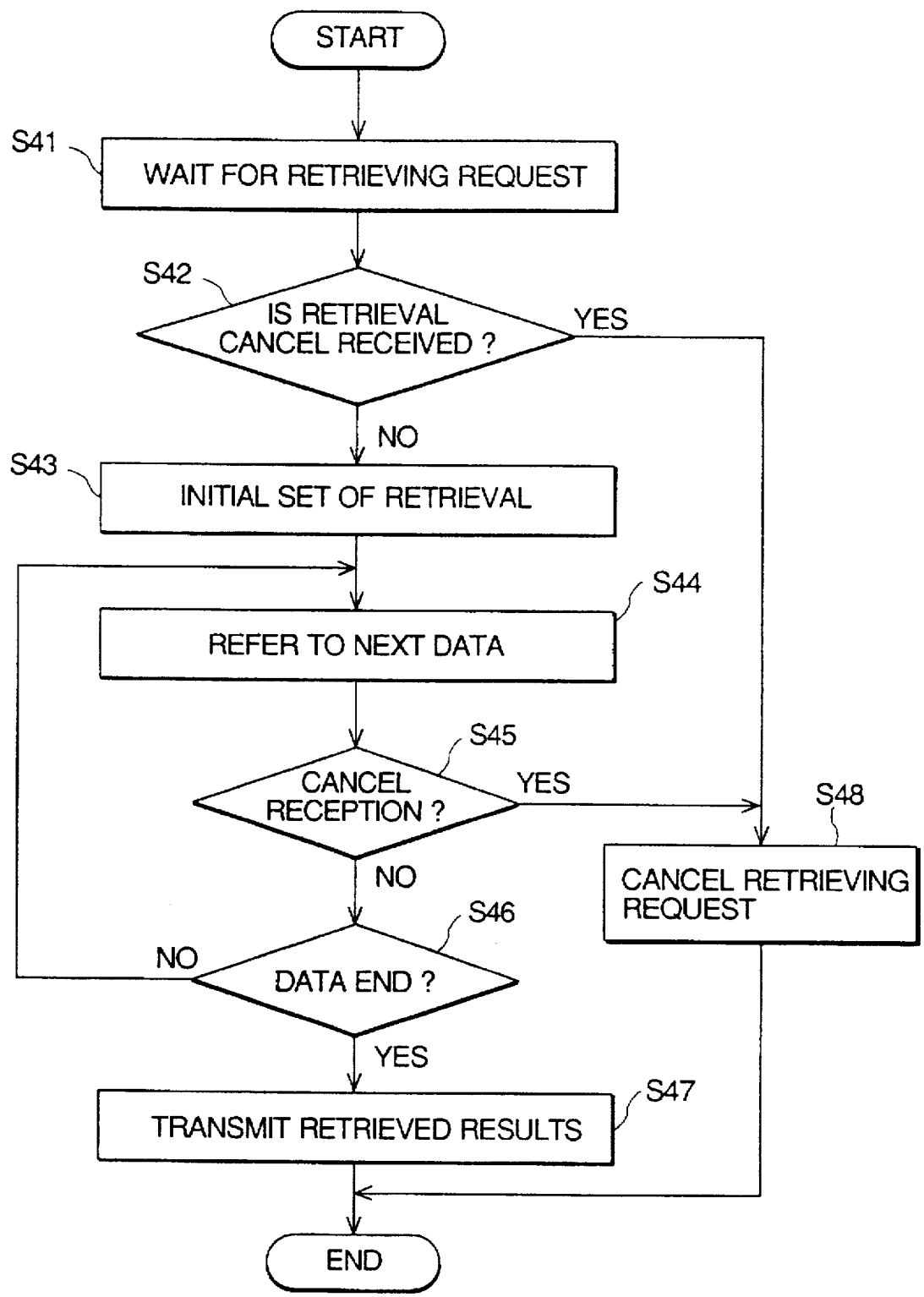
Figure 11:
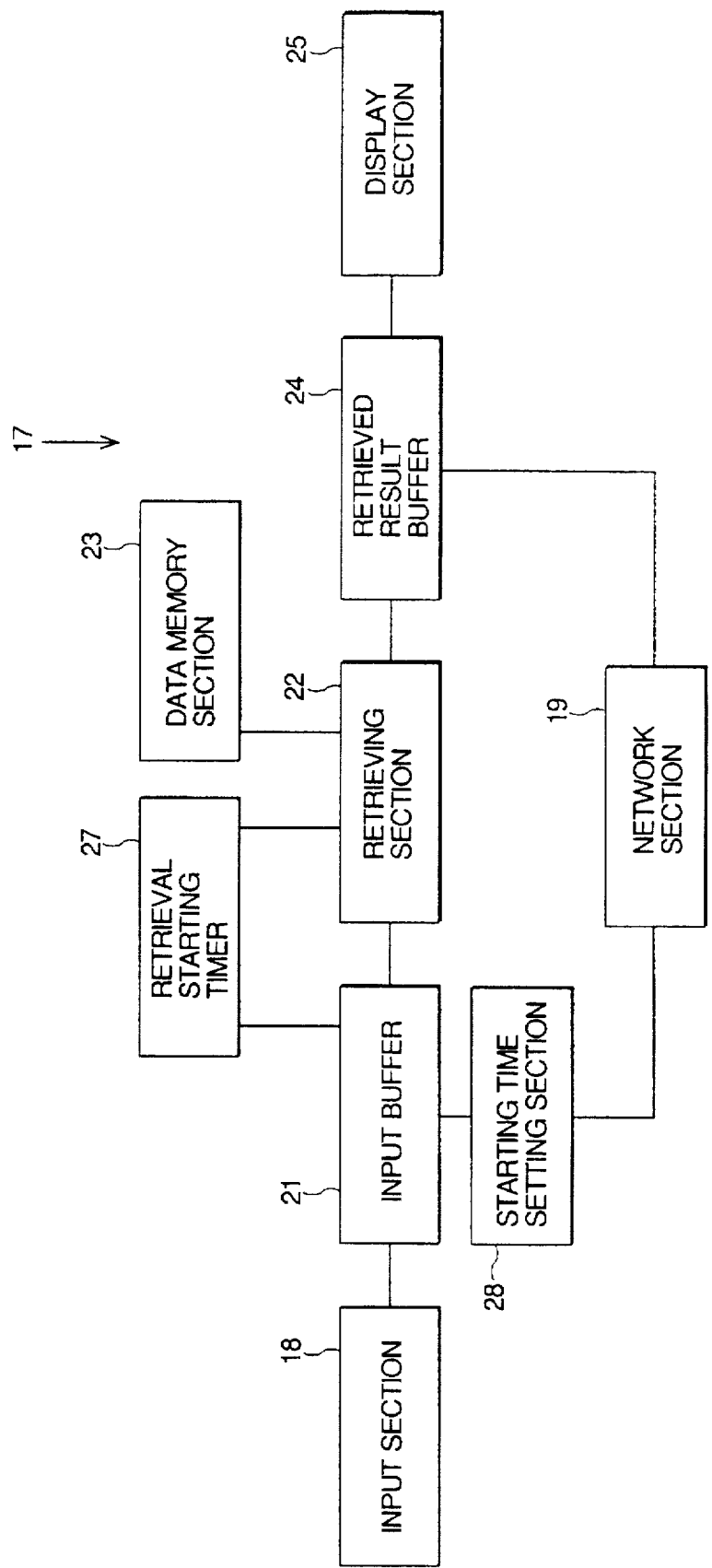
Figure 12A:
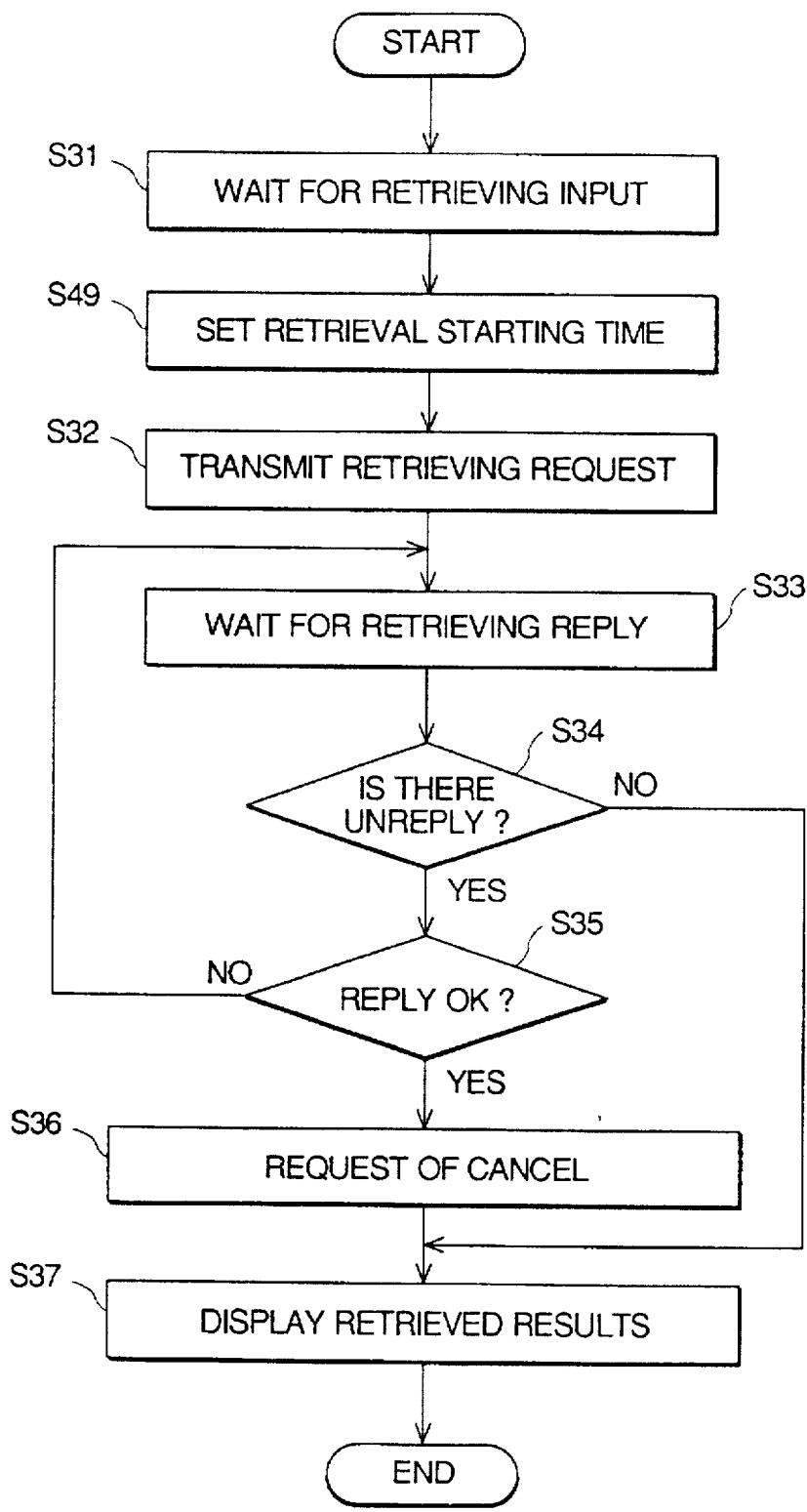
Figure 12B:
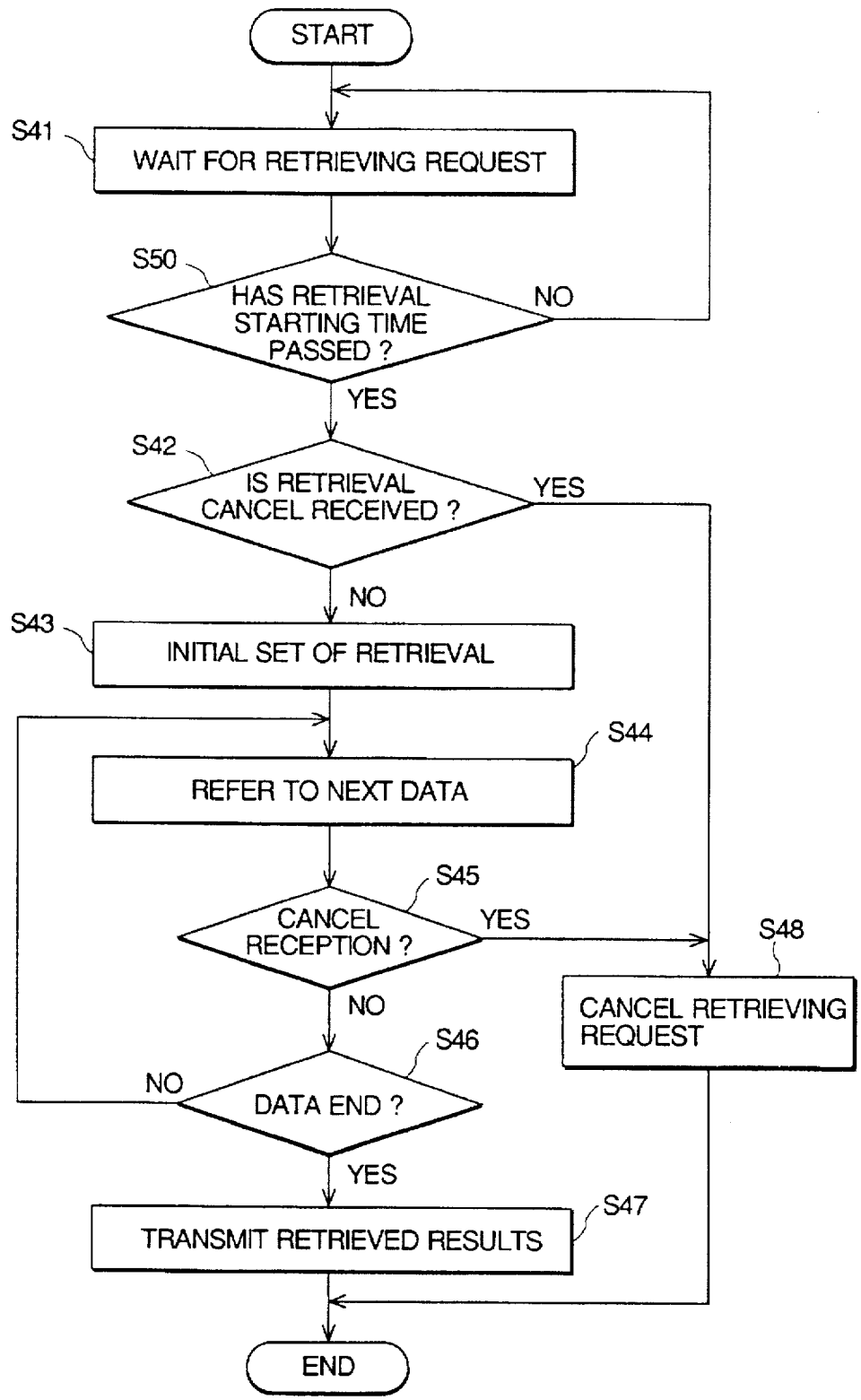
Figure 13:
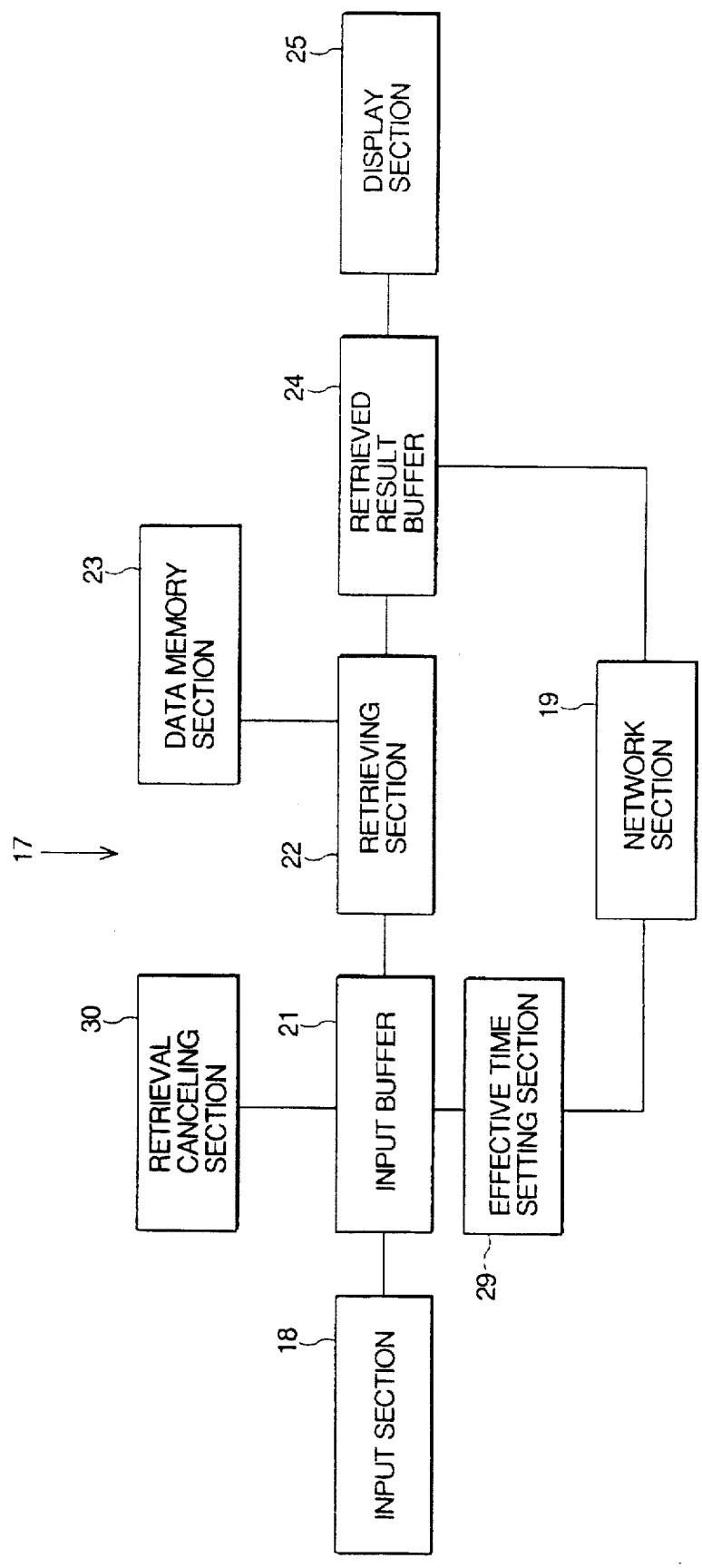
Figure 14A:
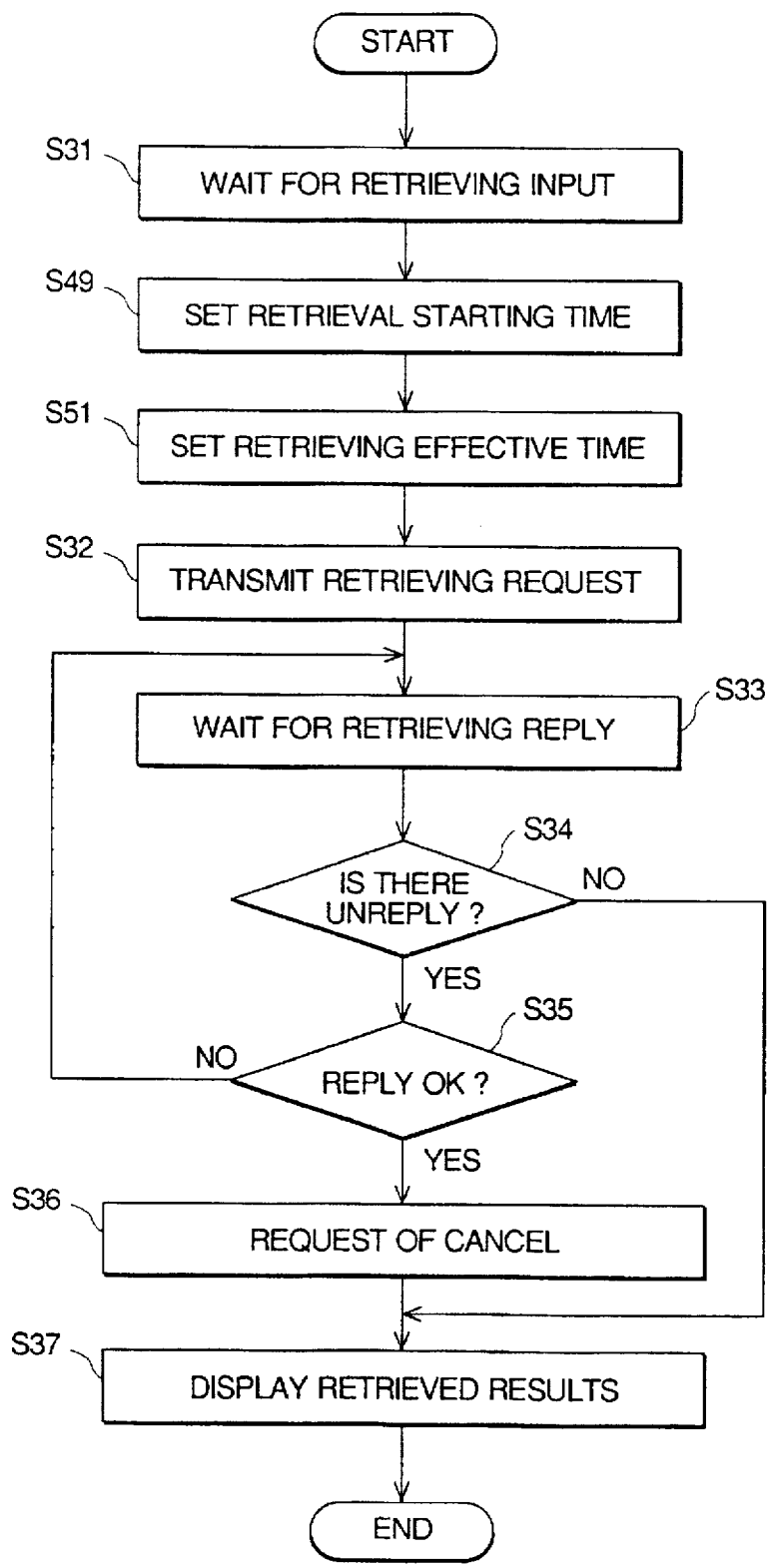
Figure 14B:
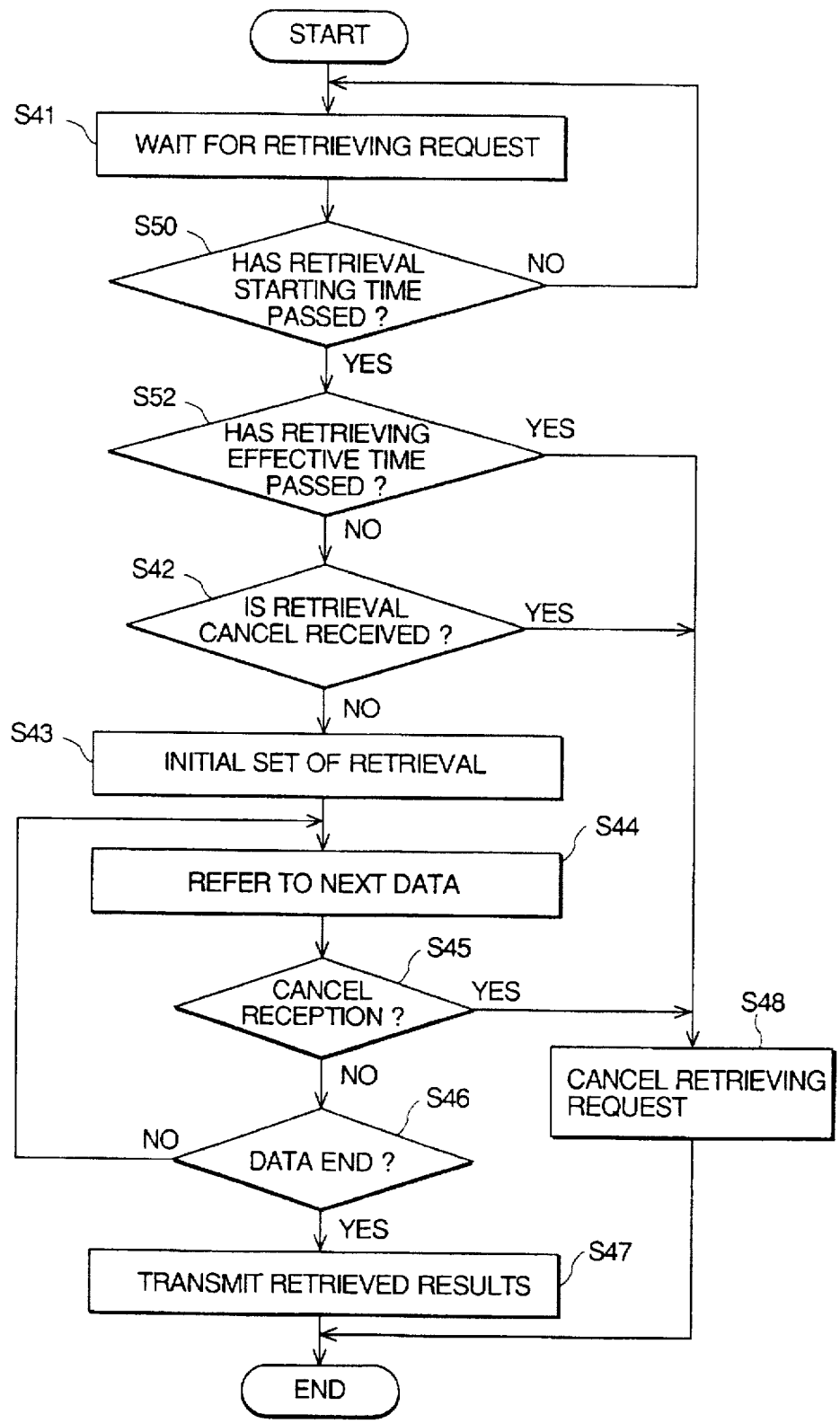
Figure 15:
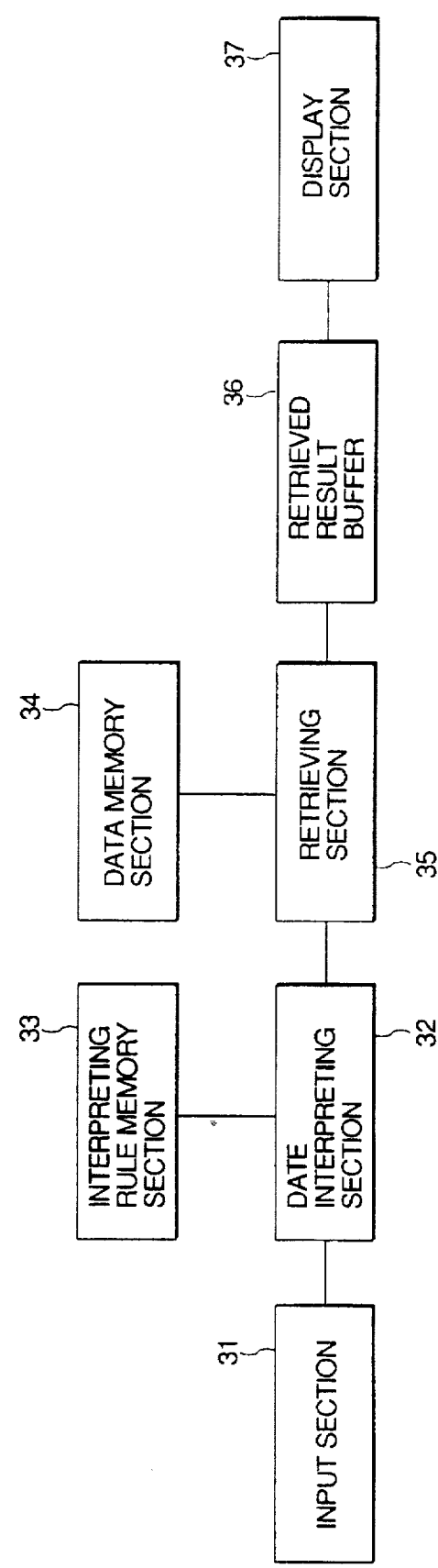
Figure 18:
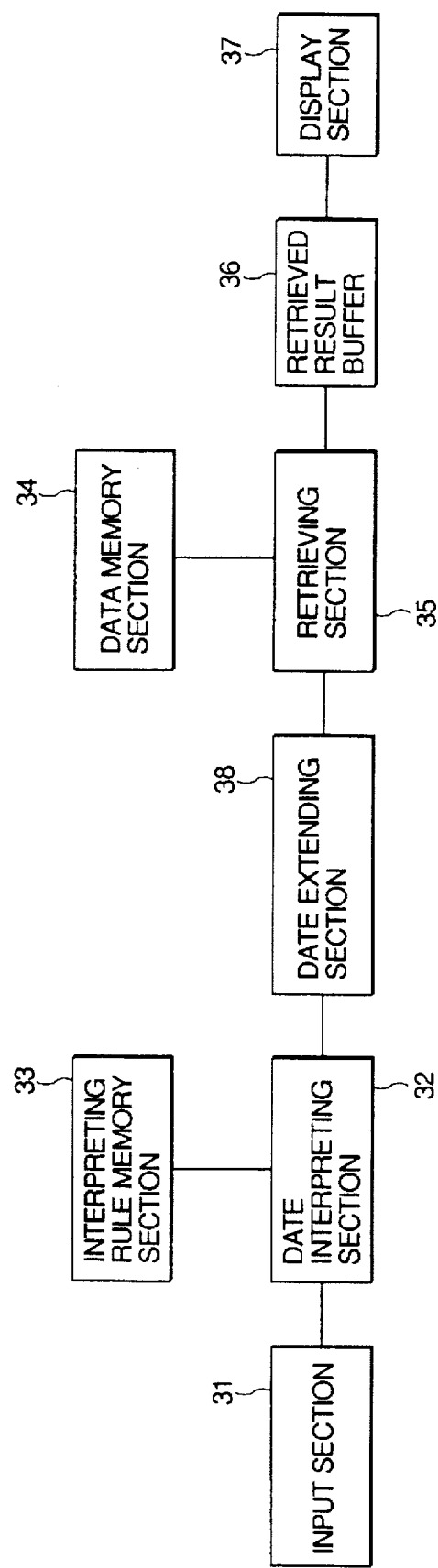
Figure 19:
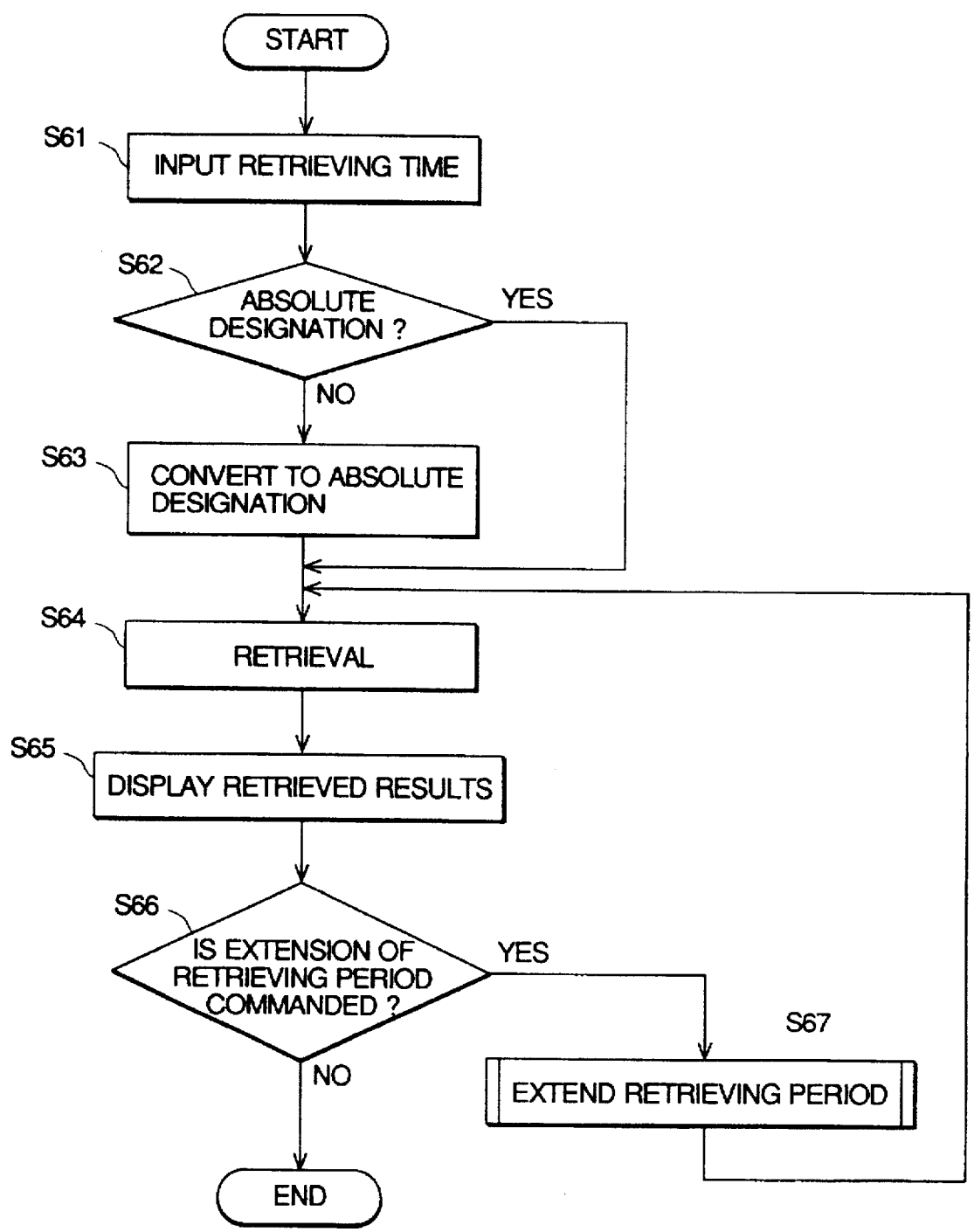
Figure 20:
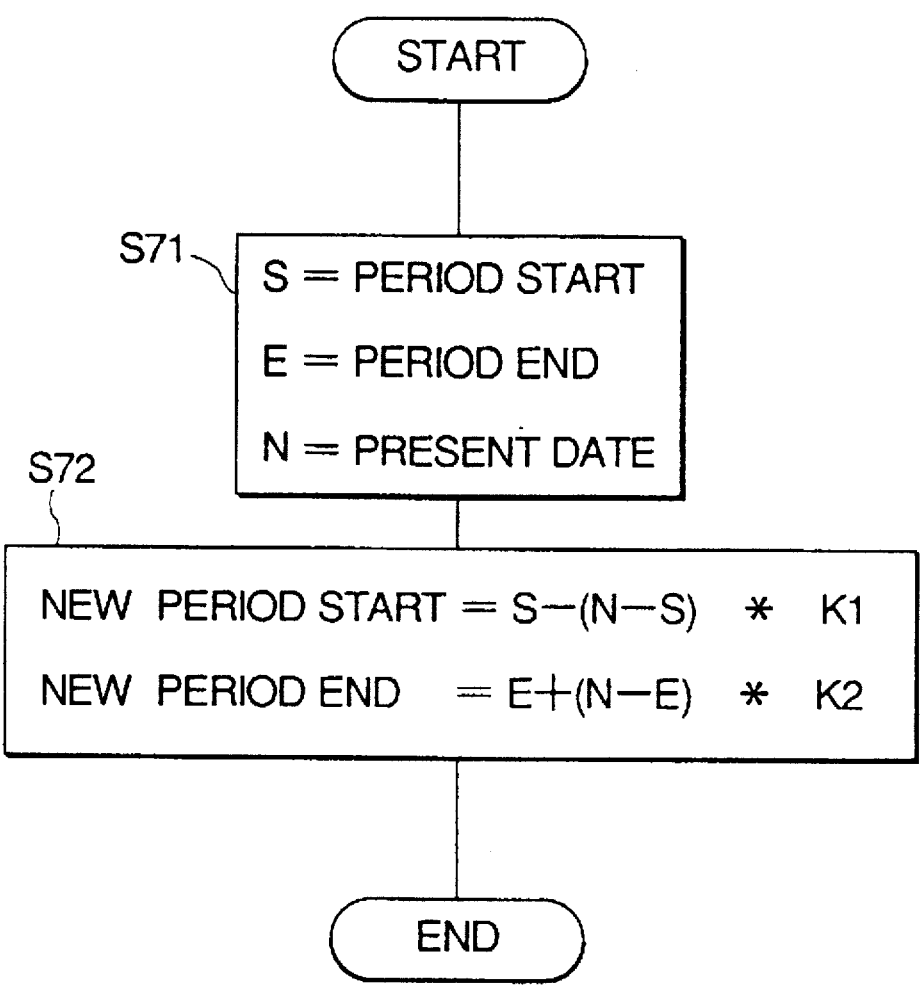

FIG. 3 is a block diagram showing the construction of an information retrieving apparatus having a third construction of the present invention;

FIG. 4 is a flow chart showing an operation of the information retrieving apparatus having the third construction as an embodiment;

FIG. 5 is a view showing a display example of a display section;

FIG. 6 is a flow chart showing the operation of an information retrieving apparatus having a fourth construction of the present invention as an embodiment;

FIG. 7 is a view showing a display example of a display section;

FIG. 8a is a block diagram showing the construction of an information retrieving apparatus having a fifth construction of the present invention;

FIG. 8b is a block diagram showing the construction of a terminal unit arranged in the information retrieving apparatus having the fifth construction;

FIG. 9 is a view showing the concept of an operation of the information retrieving apparatus having the fifth construction;

FIG. 10a is a flow chart showing an operation of the information retrieving apparatus having the fifth construction on a signal transmitting side;

FIG. 10b is a flow chart showing an operation of the information retrieving apparatus having the fifth construction on a signal receiving side;

FIG. 11 is a block, diagram showing the construction of an information retrieving apparatus having a seventh construction of the present invention;

FIG. 12a is a flow chart showing an operation of the information retrieving apparatus having the seventh construction as an embodiment on a signal transmitting side;

FIG. 12b is a flow chart showing an operation of the information retrieving apparatus having the seventh construction as an embodiment on a signal receiving side;

FIG. 13 is a block diagram showing the construction of an information retrieving apparatus having an eighth construction of the present invention;

FIG. 14a is a flow chart showing an operation of the information retrieving apparatus having the eighth construction as an embodiment on a signal transmitting side;

FIG. 14b is a flow chart showing an operation of the information retrieving apparatus having the eighth construction as an embodiment on a signal receiving side;

FIG. 15 is a block diagram showing the construction of an information retrieving apparatus having a ninth construction of the present invention;

FIG. 16 is a view showing an example of a date expression interpreted by a date interpreting section arranged in the information retrieving apparatus having the ninth construction;

FIG. 17 is a view showing an example of a time interpreting rule in the information retrieving apparatus having the ninth construction;

FIG. 18 is a block diagram showing the construction of an information retrieving apparatus having a tenth construction of the present invention;

FIG. 19 is a flow chart showing an operation of the information retrieving apparatus having the tenth construction;

FIG. 20 is a flow chart showing the operation of an information retrieving apparatus having an eleventh construction of the present invention;

8

Figure 22:
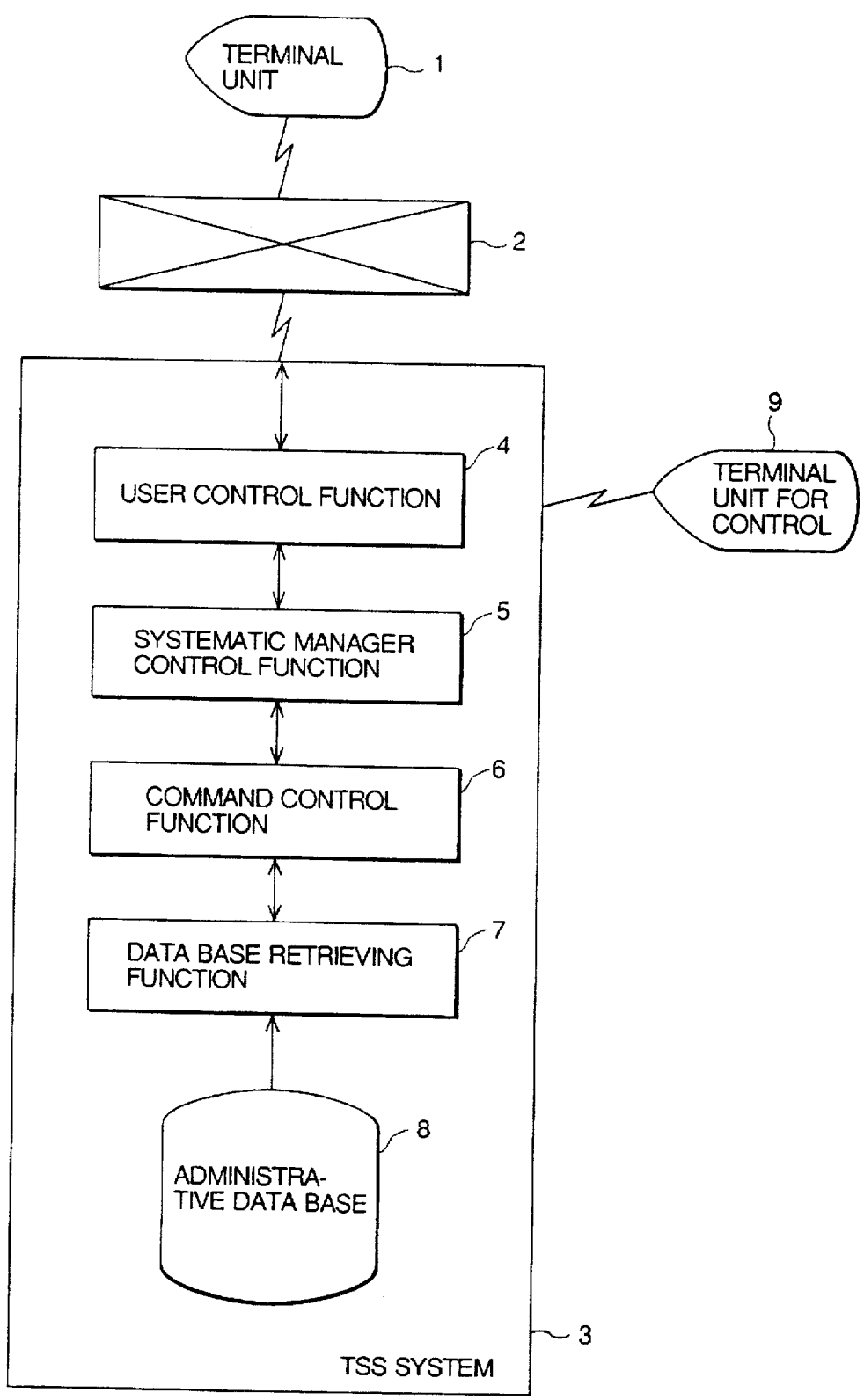

FIG. 21 is a view showing a display example of a display section arranged in the information retrieving apparatus having the eleventh construction; and FIG. 22 is a block diagram showing the construction of a general information retrieving apparatus.

DESCRIPTION OF THE PREFERRED EMBODIMENTS

The preferred embodiments of an information retrieving apparatus in the present invention will next be described in detail with reference to the accompanying drawings.

Figure 1:
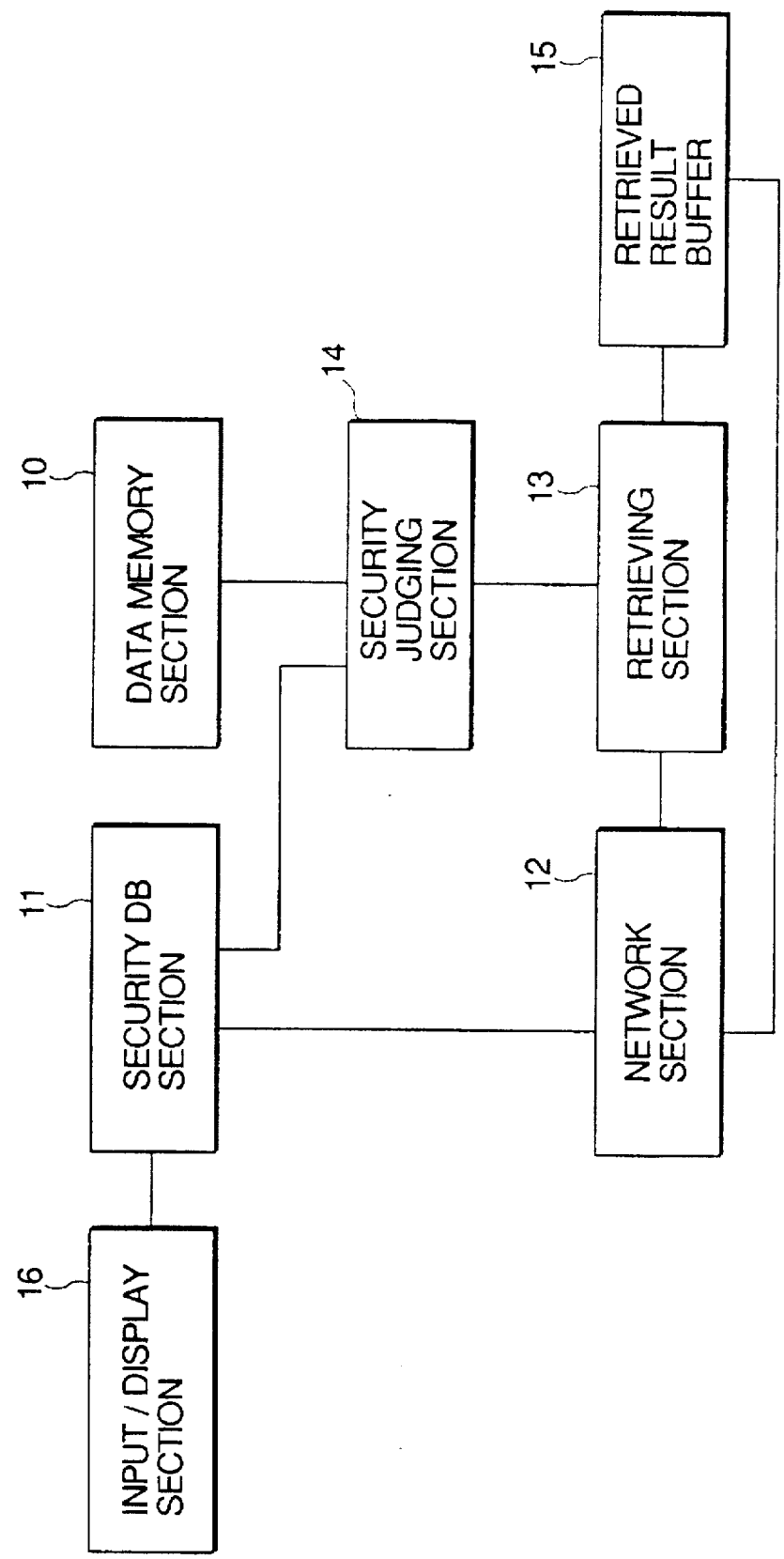
FIG. 1 is a block diagram showing the construction of an information retrieving apparatus having a first construction of the present invention.

An embodiment of an information retrieving apparatus having a first construction of the present invention will be explained with reference to FIG. 1. An object of this embodiment is to provide an information retrieving apparatus capable of instantly retrieving the security level of an inquirer unregistered to a security data base in advance when there is an inquiry from this inquirer.

The information retrieving apparatus in this embodiment has a data memory section 10, a security DB section 11, a network section 12, a retrieving section 13, a security judging section 14, a retrieved result buffer 15 and an input/display section 16. The data memory section 10 is arranged as a data memory means for holding retrieved data and a security level thereof. The security DB section 11 is arranged as a data base means for storing the security level of an inquirer. The network section 12 is connected to a network of a public communication line, etc. and transmits and receives signals. The retrieving section 13 is arranged as a first retrieving means for retrieving whether or not the security level of the inquirer is registered to the security DB section 11 with respect to a retrieving request of desirable retrieved data from a terminal unit connected to the network. When this security level of the inquirer is registered, the retrieving section 13 as the first retrieving means retrieves the retrieved data stored to the data memory section 10 and the security level of the retrieved data. The security judging section 14 is arranged as a judging means for judging whether the security level of the inquirer and the security level of the retrieved data are in conformity with each other or not. The retrieved result buffer 15 is arranged as s buffer means for temporarily storing retrieved results of the retrieved data when the security level of the inquirer and the security level of the retrieved data are in conformity with each other. The retrieved result buffer 15 as the buffer means transmits a signal to a terminal on an inquirer side through the network section 12. The input/display section 16 is arranged as an input/display means capable of displaying the retrieving request, an inquirer's name, etc., and additionally storing the security level of the inquirer to the security DB section 11 when no security level of the inquirer is registered to the security DB section 11 with respect to the retrieving request of the desirable retrieved data from the terminal unit connected to the network.

Figure 2A:
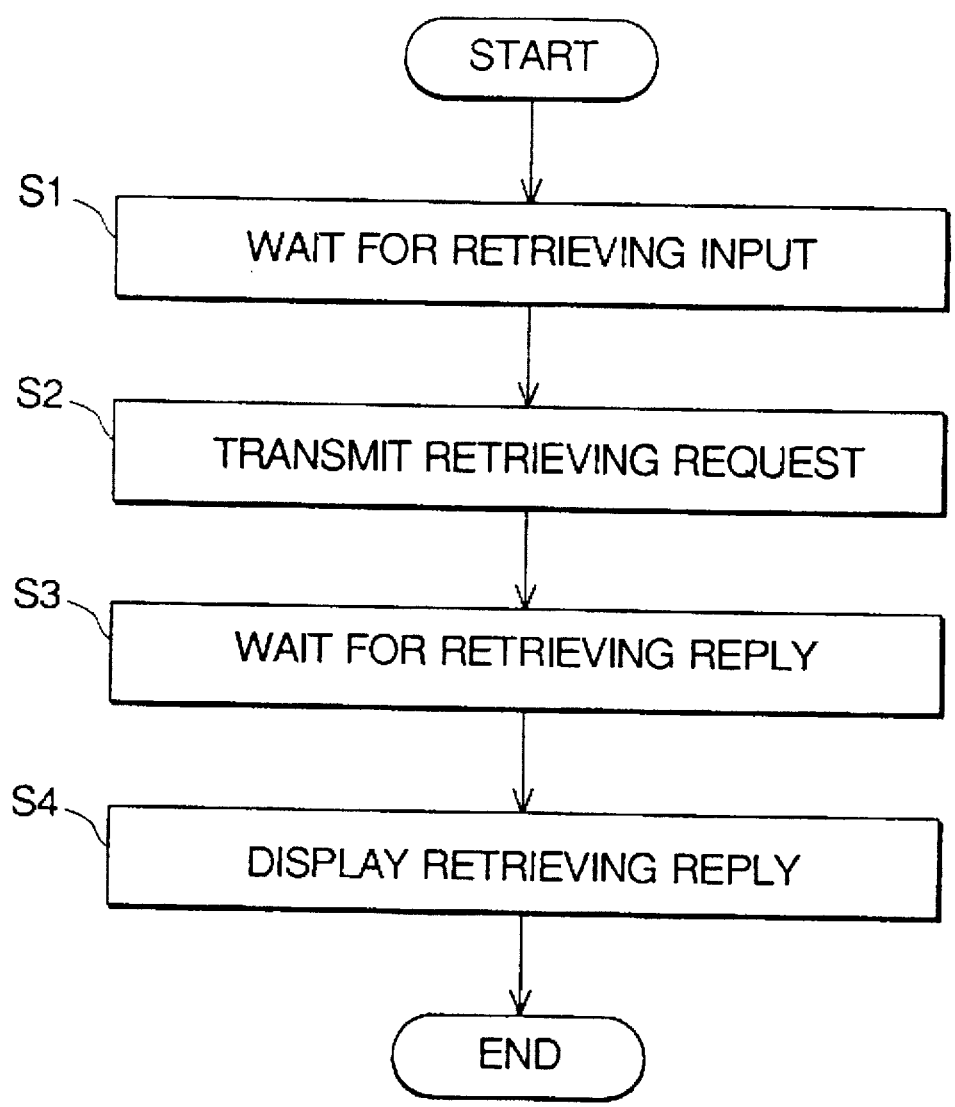
FIG. 2a is a flow chart showing an operation of the information retrieving apparatus having the first construction on a signal transmitting side.
Figure 2B:
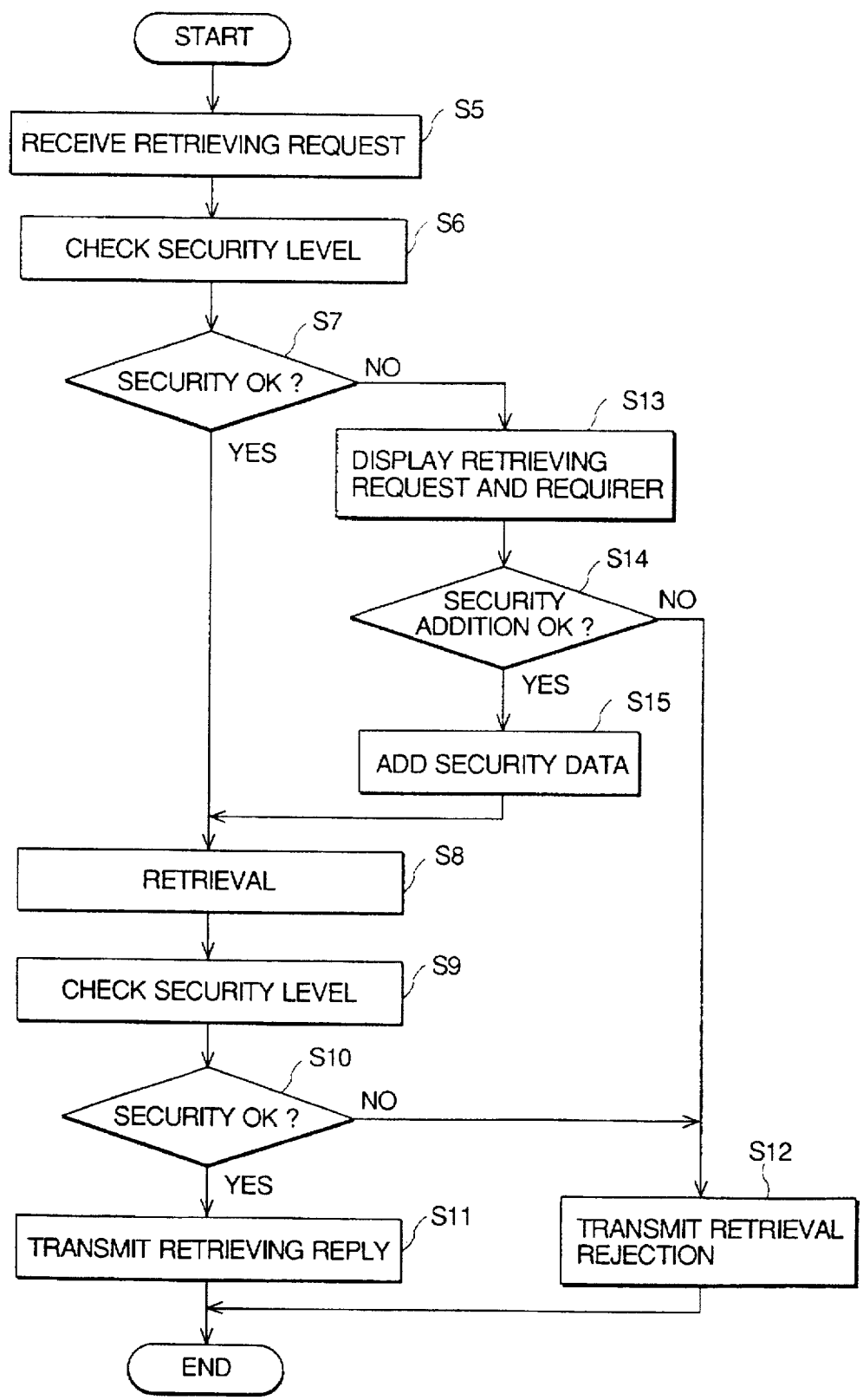
FIG. 2b is a flow chart showing an operation of the information retrieving apparatus having the first construction on a signal receiving side.

An operation of the information retrieving apparatus in this embodiment will next be explained with reference to flow charts shown in FIGS. 2a and 2b.

In a step S1, a terminal unit on a signal transmitting side waits for a retrieving condition inputted to the terminal unit by a user. When the retrieving condition is inputted to the terminal unit, this retrieving condition is transmitted to the information retrieving apparatus connected to the network in a step S2. In a step S3, the terminal unit on the signal transmitting side then attains a standby state for waiting for a reply from the information retrieving apparatus. When the terminal unit receives the retrieving reply, the terminal unit displays this retrieving reply in a display section in a step S4.

In a step S5, the information retrieving apparatus on a signal receiving side receives a retrieving request from the terminal unit on the signal transmitting side. When this retrieving request is received, it is judged in a step S6 whether the security level of an inquirer or the terminal unit issuing the retrieving request is registered to the security DB section 11 or not. When the security level of the inquirer or the terminal unit issuing the retrieving request is registered to the security DB section 11 in a step S7, retrieved data and its security level held in the data memory section 10 are retrieved by the retrieving section 13 in a step S8 in accordance with the retrieving request from the terminal unit on the signal transmitting side. In a step S9, the security judging section 14 compares the security level of the retrieved data with the security level of the inquirer. When the security level of the retrieved data is lower than that of the inquirer in a step S10, these retrieved data are temporarily stored to the retrieved result buffer 15 and are then transmitted by the network section 12 to the terminal unit through a network in a step S11. In contrast to this, when no security level of the inquirer reaches the security level of the retrieved data, retrieval rejection is transmitted in a step S12.

When no security level of the inquirer issuing the retrieving request is registered to the security DB section 11 in the above step S7, the retrieving request and an inquirer's name are displayed in the input/display section 16 in a step S13. When a data holder as a data possessor gives commands for adding the security level of the inquirer by the input/display section 16 in a step S14, the security level of the inquirer is added to the security DB section 11 in a step S15 and the above-mentioned operations after the step S8 are then performed. In contrast to this, when no user gives commands for adding the security level of the inquirer by the input/display section 16, the retrieval rejection is transmitted in the step S12.

Accordingly, it is possible to omit an operation for making a security data base by predicting the inquirer in advance.

An embodiment of an information retrieving apparatus having a third construction of the present invention will next be explained with reference to FIG. 3. An object of this embodiment is to provide a simple information retrieving apparatus in which a security judgment is made by a data possessor.

The information retrieving apparatus in this embodiment has a data memory section 10, a security DB section 11, a network section 12, a retrieving section 13, a retrieved result buffer 15 and an input/display section 16. The data memory section 10 holds retrieved data and a security level thereof. The security DB section 11 stores the security level of an inquirer. The network section 12 is connected to a network of a public communication line, etc. and transmits and receives signals. The retrieving section 13 retrieves the retrieved data and its security level stored to the data memory section 10 with respect to a retrieving request of desirable retrieved data from a terminal unit connected to the network of the public communication line, etc. The retrieved result buffer 15 temporarily stores retrieved results of the retrieved data and transmits the retrieved results to a terminal on an inquirer side through the network section 12. The input/display section 16 displays the retrieved results and information of the inquirer, etc. when no security level of the inquirer is registered to the security DB section 11 with respect to the retrieving request of desirable retrieved data from the terminal unit connected to the network.

The security level of the inquirer is inputted in the embodiment of the first construction. However, in this embodiment, the information retrieving apparatus requires a judgment about transmission of the retrieved results from a data possessor. The retrieved results are transmitted or retrieval is rejected by this request from the data possessor. An operation of the information retrieving apparatus in this embodiment will next be explained with reference to a flow chart shown in FIG. 4.

When the information retrieving apparatus on a signal receiving side receives a retrieving request from a terminal unit on a signal transmitting side in a step S21, the retrieving section 13 retrieves retrieved data held in the data memory section 10 in a step S22. In a step S23, a security level of the retrieved data is compared with the security level of an inquirer and it is checked whether the retrieved data are data accessible by the inquirer or not. In a step S24, it is judged whether data inhibited in access are included in the retrieved data or not. When no access inhibiting data are included in the retrieved data, a retrieving reply is transmitted in a step S25. In contrast to this, when the access inhibiting data are included in the retrieved data, a retrieving request 100, a retrieving requirer 101 and a reply 102 are displayed in the input/display section 16 in a step S26 as shown in FIG. 5. When a judgment 103 on allowance of the transmission of data inhibited in signal transmission is commanded by a data possessor using the input/display section 16 in a step S27, the retrieving reply is transmitted in a step S25. In contrast to this, when a judgment on unallowance of the transmission of data inhibited in signal transmission is commanded by the data possessor using the input/display section 16, retrieval rejection is transmitted in a step S28.

Accordingly, it is possible to omit an operation for making a security data base by predicting the inquirer in advance.

An embodiment of an information retrieving apparatus having a fourth construction of the present invention will next be explained with reference to a flow chart shown in FIG. 6. An object of this embodiment is to provide an information retrieving apparatus for automatically registering the security level of an inquirer when a data possessor judges by the input/display section 16 that data inhibited in signal transmission may be transmitted.

When the information retrieving apparatus on a signal receiving side receives a retrieving request from a terminal unit on a signal transmitting side in a step S21, the retrieving section 13 retrieves retrieved data held in the data memory section 10 in a step S22. In a step S23, a security level of the retrieved data is compared with the security level of an inquirer and it is checked whether the retrieved data are data accessible by the inquirer or not. In a step S24, it is judged whether data inhibited in access are included in the retrieved data or not. When no access inhibiting data are included in the retrieved data, a retrieving reply is transmitted in a step S25. In contrast to this, when the access inhibiting data are included in the retrieved data, a retrieving request 100, a retrieving requirer 101 and a reply 102 are displayed in the input/display section 16 in a step S26 as shown in FIG. 7. When a judgment on allowance of the transmission of data inhibited in signal transmission is commanded by a user using the input/display section 16 in a step S27, a security level of a lowest limit for clearing the security level of these retrieved data is registered to the security DB section 11 together with ID (identification data) of the inquirer and the retrieving reply is transmitted in a step S25. In contrast to this, when a judgment on unallowance of the transmission of data inhibited in signal transmission is commanded by the user using the input/display section 16, retrieval rejection is transmitted in a step S28.

Accordingly, the security level of the inquirer in retrieved results is registered to a security data base by only allowing transmission of the retrieved results by a data possessor in the retrieving apparatus.

An embodiment of an information retrieving apparatus having a fifth construction of the present invention will next be explained with reference to FIGS. 8a and 8b. An object of this embodiment is to provide an information retrieving apparatus capable of rejecting a retrieving request which becomes meaningless.

As shown in FIG. 8a, a plurality of terminal units 17 are connected to each other through a network 50 in the information retrieving apparatus in this embodiment. Each of these terminal units 17 is set to a terminal unit on a signal transmitting side or a signal receiving side. As shown in FIG. 8b, each of the terminal units 17 has an input section 18, a network section 19, a cancel requiring section 20, an input buffer 21, a retrieving section 22, a data memory section 23, a retrieved result buffer 24, a display section 25 and a retrieval canceling section 26. The input section 18 is arranged as an input means for inputting retrieval/question contents. The network section 19 is arranged as a network means for communicating a retrieving request and retrieved results through the network 50. The cancel requiring section 20 is arranged as a requiring means for transmitting a retrieving request cancel to a terminal unit on a signal receiving side from which no reply is transmitted when retrieved results are received through the network 50 and a predetermined condition is satisfied. The input buffer 21 is arranged as an input buffer means for temporarily holding the retrieving request. The retrieving section 22 is arranged as a retrieving means for performing a retrieving operation with respect to an input of the retrieving request. The data memory section 23 is arranged as a data memory means for holding retrieved data. The retrieved result buffer 24 is arranged as a buffer means for temporarily holding the retrieved results. The display section 25 is arranged as a display means for displaying an inputting situation, a retrieving situation, the retrieved results, etc. The retrieval canceling section 26 is arranged as a canceling means for deleting a retrieving request corresponding to a cancel request when this cancel request is inputted to this retrieval canceling section 26.

For example, as shown in FIG. 9, when a retrieving request is issued from a terminal unit A to each of terminal units B, C, D and E, the retrieving request is received by each of the terminal units B, C and D without delay so that a retrieving operation is immediately started. The retrieving request is received by the terminal unit E with delay since this retrieving request is transmitted through a network. The retrieving operation is first terminated in the terminal unit C so that retrieved results are transmitted to the terminal unit A. The terminal unit A then receives the retrieved results and judges whether these retrieved results satisfy a retrieval terminating condition. When only one retrieved result is required in the terminal unit A, a request of retrieval cancel is issued to each of the terminal units B, D and E transmitting no reply yet. Each of the terminal units B and D receiving the canceling request immediately stops the retrieving operation. The terminal unit E does not perform the retrieving operation yet so that the retrieving request is canceled. This embodiment sets a case in which one reply is obtained as a canceling condition. However, it is considered that various kinds of cases are set in this canceling condition when the retrieving request is issued.

An operation of the information retrieving apparatus in this embodiment will next be explained with reference to flow charts shown in FIGS. 10a and 10b. An operation of the terminal unit A on a signal transmitting side will first be explained.

In a step S31, the terminal unit A on the signal transmitting side waits for a retrieving request inputted to the terminal unit A by a user. When the retrieving request is inputted to the terminal unit A, this retrieving request is converted to a retrieving formula set such that the retrieving request can be interpreted by each of the terminal units B, C, D and E on a signal receiving side. In a step S32, the converted retrieving request is then issued to each of the terminal units B, C, D and E on the signal receiving side connected to each other through the network 50. Thereafter, in a step S33, the terminal unit A waits for a reply from each of the terminal units B, C, D and E on the signal receiving side. When the terminal unit A receives a reply from any one of the terminal units B, C, D and E on the signal receiving side, it is judged in a step S34 whether or not there is a terminal unit sending no reply yet to the terminal unit A among the terminal units to which the retrieving request is issued. When there is a terminal unit sending no reply to the terminal unit A, it is judged in a step S35 whether the above received reply satisfies a user's request or not. It is considered that an example of the user's request is set to "it is sufficient to obtain one reply", "it is sufficient to obtain N-replies", "it is sufficient to obtain OK by asking the user", etc. For example, it is sufficient to obtain one reply with respect to the retrieving request of "want to know a telephone number of Mr. XX". Accordingly, this retrieving request is satisfied if a reply is first received. Set contents of the user's request are different from each other in accordance with retrieving requests. Therefore, it is desirable that such contents of the user's request can be set every retrieving request. When the reply satisfies the user's request, a request of retrieval cancel is transmitted from the terminal unit A on the signal transmitting side to the other terminal units each transmitting no reply yet in a step S36. In a step S37, retrieved results are displayed in the display section 25.

An operation of each of the terminal units B, C, D and E on the signal receiving side will next be explained.

In a step S41 shown in FIG. 10b, each of the terminal units B, C, D and E on the signal receiving side waits for a retrieving request transmitted from the terminal unit A on the signal transmitting side. It is judged in a step S42 whether or not a request of retrieval cancel is transmitted to each of the terminal units B, C, D and E from the cancel requiring section 20 of the terminal unit A on the signal transmitting side. In a step S43, a retrieving operation of the information retrieving apparatus is initially set when no retrieval canceling request is transmitted to each of the terminal units B, C, D and E on the signal receiving side and each of these terminal units B, C, D and B receives the retrieving request transmitted from the terminal unit A on the signal transmitting side. In a step S44, it is judged by the retrieving section 22 whether data of the retrieving section 22 are in conformity with the retrieving request or not. In a step S45, it is judged whether a canceling request is received or not during retrieving processing. When no canceling request is received during the retrieving processing, it is judged in a step S46 whether data to be considered are terminated or not. When the data to be considered are terminated, retrieved results are stored to the retrieved result buffer 24 and are transmitted by the network section 19 from the retrieved result buffer 24 to the terminal unit A on the signal transmitting side through the network 50 in a step S47. When the retrieval canceling request is transmitted from the terminal unit A on the signal transmitting side in the above step S42 or when the canceling request is received during the retrieving processing in the step S45, the retrieving operation is stopped and the retrieving request is canceled by the retrieval canceling section 26.

Accordingly, using efficiency of the information retrieving apparatus can be improved. Further, no unnecessary retrieved results are transmitted so that utilizing efficiency of a network can be improved.

An embodiment of an information retrieving apparatus having a seventh construction of the present invention will next be explained with reference to FIG. 11. An object of this embodiment is to provide an information retrieving apparatus capable of preventing its operable rate from being reduced by setting starting times of retrieval to be different from each other with delay by a plurality of terminal units on a signal receiving side.

Similar to the above information retrieving apparatus shown in FIGS. 8a and 8b, a plurality of terminal units 17 are connected to each other through a network 50 in the information retrieving apparatus in this embodiment. Each of these terminal units 17 is set to a terminal unit on a signal transmitting side or a signal receiving side. As shown in FIG. 11, each of the terminal units 17 has an input section 18, a network section 19, an input buffer 21, a retrieving section 22, a data memory section 23, a retrieved result buffer 24, a display section 25, a retrieval starting timer 27 and a starting time setting section 28. The input section 18 is arranged as an input means for inputting retrieval/question contents. The network section 19 is arranged as a network means for communicating a retrieving request and retrieved results through the network 50. The input buffer 21 is arranged as an input buffer means for temporarily holding the retrieving request. The retrieving section 22 performs a retrieving operation with respect to an input of the retrieving request. The data memory section 23 is arranged as a data memory means for holding retrieved data. The retrieved result buffer 24 is arranged as a retrieved result buffer means for temporarily holding the retrieved results. The display section 25 is arranged as a display means for displaying an inputting situation, a retrieving situation, the retrieved results, etc. The retrieval starting timer 27 uses information of a starting time of retrieval transmitted in addition to the retrieving request and delays execution of retrieval until this starting time. The starting time setting section 28 sets the starting time of retrieval when the retrieving request is issued.

When the retrieval starting time or a predetermined time from arrival of the retrieving request is set by the retrieving request, no retrieving operation is performed until this time. For example, when the retrieving request is issued to each of terminal units B, C and D, it is supposed that retrieving cost is set to be higher in an order of terminal units from B to D (terminal unit B<terminal unit C<terminal unit D with respect to the retrieving cost). In this case, it is desirable that the terminal unit B immediately starts the retrieving operation and the terminal unit C starts the retrieving operation after a time for approximately terminating the retrieving operation of the terminal unit B has passed. It is also desirable that the terminal unit D starts the retrieving operation after a time for approximately terminating the retrieving operation of the terminal unit C has passed. In this case, when the retrieving request is transmitted to each of the terminal units B, C and D, starting times of the retrieving operation are set such that the above condition of terminal unit B<terminal unit C<terminal unit D is satisfied. If retrieved results can be obtained by the terminal unit B, a canceling request is immediately issued to each of the terminal units C and D as in the above embodiments so that it is not necessary to perform an expensive retrieving operation. It is possible to simultaneously perform the retrieving operations of the terminal units B, C and D in parallel with each other in accordance with situations.

An operation of this information retrieving apparatus will next be explained with reference to flow charts shown in FIGS. 12a and 12b. An operation of the terminal unit A on the signal transmitting side will first be explained. In FIGS. 12a and 12b, steps for performing the same operations as FIGS. 10a and 10b are designated by the same reference numerals and an explanation of these steps is omitted in the following description.

In a step S49, a starting time of retrieval is set by the starting time setting section 28 of the terminal unit A on the signal transmitting side. Starting times of retrieval with respect to the terminal units on the signal receiving side can be set to be different from each other.

In a step S50, it is judged whether the present time is a time before or after a set time for starting a retrieving operation by using information of the retrieval starting time transmitted together with a retrieving request by the retrieval starting timer 27 of the terminal unit on the signal receiving side. When the present time is a time before the set time for starting the retrieving operation, the information retrieving apparatus waits for the retrieving request until this set time. When the starting time has passed and no retrieving request is received, processing of the information retrieving apparatus is terminated by only canceling the retrieving request without performing the retrieving operation.

Accordingly, overlapping retrievals can be reduced to the utmost by issuing the retrieving request by shifting retrieving times from each other.

An embodiment of an information retrieving apparatus having an eighth construction of the present invention will next be explained with reference to FIG. 13. An object of this embodiment is to provide an information retrieving apparatus for canceling a retrieving request without executing a retrieving operation when the retrieving request is transmitted to a terminal unit on a signal receiving side after a designated time. In FIG. 13, the same constructional portions as FIGS. 8a and 8b are designated by the same reference numerals and an explanation thereof is omitted in the following description.

A terminal unit 17 has an effective time setting section 29 and a retrieval canceling section 30. The effective time setting section 29 sets an effective time of a retrieving request. The retrieval canceling section 30 compares the present time with the retrieving effective time included in the retrieving request transmitted through a network. The retrieval canceling section 30 deletes this retrieving request when the present time passes the retrieving effective time.

A certain network has a structure in which no messages are instantly transmitted. For example, there is a network system in which messages are sent via a plurality of computers and these computers transmit messages as a task only every predetermined time. In such a system, it is impossible to know an arriving time at which the retrieving request is transmitted to a terminal unit on a signal receiving side of each of the computers. When this terminal unit is used as an information retrieving apparatus and the network can be used only in an office and a user of this information retrieving apparatus goes out, no retrieving request is transmitted to this information retrieving apparatus until the user returns to the office. When no retrieved results can be obtained until a predetermined time, the retrieving request becomes meaningless in many cases. For example, when a person wants to know a tomorrow's schedule of a company, it is necessary for this person to obtain retrieved results at least during today. In this case, the retrieving request becomes meaningless on the next day. When the information retrieving apparatus in this embodiment is used, the retrieving request transmitted after the retrieving effective time is canceled without performing the retrieving operation. Accordingly, no meaningless retrieving operation is performed in this embodiment.

When information is needed during today, the retrieving effective time is set to a today's returning time of the company and the retrieving request is transmitted. If the terminal unit on the signal receiving side receives the retrieving request on the next day, this day passes the retrieving effective time so that this retrieving request is canceled and no retrieving operation is performed.

An operation of the information retrieving apparatus in this embodiment will next be explained with reference to flow charts shown in FIGS. 14a and 14b. The operation of a terminal unit A on a signal transmitting side will first be explained. In FIGS. 14a and 14b, steps for performing the same operations as FIGS. 12a and 12b are designated by the same reference numerals and an explanation of these steps is omitted in the following description.

In a step S51, a retrieving effective time showing a time of effectiveness of a retrieving request is set by the effective time setting section 29 of the terminal unit A on the signal transmitting side. The retrieving request is effective until this retrieving effective time.

In a step S52, the retrieval canceling section 30 of a terminal on a signal receiving side compares the present time with a retrieving effective time included in the retrieving request transmitted through a network. When the present time passes the retrieving effective time, no retrieving operation is performed and this retrieving request is deleted in a step S48. For example, there is a system in which transmission of the retrieving request is buffered in a certain place and the retrieving request is processed every predetermined time. In this system, there is a case in which the retrieving request itself already becomes meaningless at a stage at which the retrieving request is transmitted to this system.

Accordingly, the retrieving request is issued by designating the retrieving effective time. Therefore, the information retrieving apparatus can be set such that no retrieving operation is performed with respect to the retrieving request which already becomes meaningless after the effective time has passed.

An embodiment of an information retrieving apparatus having a ninth construction of the present invention will next be explained with reference to FIG. 15. An object of this embodiment is to provide an information retrieving apparatus capable of interpreting a relative date expression.

As shown in FIG. 15, the information retrieving apparatus in this embodiment has an input section 31, a date interpreting section 32, an interpreting rule memory section 33, a data memory section 34, a retrieving section 35, a retrieved result buffer 36 and a display section 37. The input section 31 is arranged as an input means for inputting a retrieving request. The date interpreting section 32 is arranged as an interpreting means for interpreting words relative to a date such as yesterday, tomorrow, a few days ago, etc. in the retrieving request by converting these words to a year, a month and a day of the Christian Era (A.D.). The interpreting rule memory section 33 is arranged as a rule memory means for storing a rule for interpreting the words relative to the above date. The data memory section 34 is arranged as a data memory means for holding retrieved data. The retrieving section 35 is arranged as a retrieving means for retrieving information conforming to the retrieving request from data stored to the data memory section 34 on the basis of the date interpreted by the date interpreting section 32. The retrieved result buffer 36 temporarily stores retrieved results. The display section 37 displays the retrieved results.

The Christian Era such as "Nov. 1, 1993" is used in designation of a time and a date used in retrieval. However, expressions such as last year, yesterday, last week, etc. are normally used in life in many cases with today as a starting point. The information retrieving apparatus in the present invention has a function for interpreting and converting a date expression often used daily to a date of the Christian Era. Accordingly, expressions such as last year often used daily in a retrieving condition are allowed by this function. For example, when today is set to Nov. 1, 1993, the date interpreting section 32 converts last year such that the last year is equal to 1992. For example, date expressions often used daily are shown in FIG. 16. If the present date is known, each of the date expressions can be converted to a date of the Christian Era by a simple rule.

An example of the rule for converting a date expression often used daily to a date of the Christian Era will be explained with reference to FIG. 17.

For example, a year and a month at a retrieving time point are respectively set to NOWYEAR and NOWMONTH. A year and a month for showing a retrieving range are shown by year and month and a retrieving date is set to date. In this case, the date shows days passing after a reference date. It is known that "yesterday" is a date subtracting one day from the present day. "A few days ago" shows three or two days ago from the present day. "Spring" is set to range from March to June in month and year is set to one year ago if the present month is before March. Such contents basically prescribe that retrieval is performed by referring to past data from the present time point and a spring just before is shown if only the "spring" is designated. Combinations of dates, etc. shown in FIG. 17 can be also used.

Accordingly, a relative date can be designated so that operability of the information retrieving apparatus can be further improved.

An embodiment of an information retrieving apparatus having a tenth construction of the present invention will next be explained with reference to FIG. 18. An object of this embodiment is to provide an information retrieving apparatus for performing a retrieving operation by widening the range of a designated date. In FIG. 18, the same constructional portions as FIG. 15 are designated by the same reference numerals and an explanation thereof is omitted in the following description.

The information retrieving apparatus in this embodiment has a date extending section 38 for giving commands to a retrieving section 35 such that the retrieving operation is performed by slightly widening the designated range of a date of the Christian Era provided by converting a date expression daily used by a date interpreting section 32. There are many cases in which a time memorized by a man is ambiguous. Accordingly, it is possible to prevent a retrieving failure from being caused by misunderstanding of a date by performing the retrieving operation in a range wider than the designated range. For example, the information retrieving apparatus is used such that the retrieving range is widened to all cases and is widened in the case of the retrieving failure. Further, the information retrieving apparatus is used such that the retrieving range is widened only when a user designates a widened retrieving range.

An operation of the information retrieving apparatus in this embodiment will next be explained with reference to a flow chart shown FIG. 19.

When the time of a retrieved object is inputted to the information retrieving apparatus in a step S61, it is judged in a step S62 whether or not the retrieved object time is a date of the Christian Era by the date interpreting section 32. When no retrieved object time is a date of the Christian Era, a date expression daily used as shown in FIG. 16 is converted by the date interpreting section 32 to a date of the Christian Era on the basis of a rule stored to an interpreting rule memory 33 in a step S63. In a step S64, a retrieving operation is performed by the retrieving section 35 on the basis of the retrieved object time converted to the date of the Christian Era. In a step S65, retrieved results are displayed in a display section 37. In a step S66, the information retrieving apparatus asks a user whether or not a retrieving period is extended to further perform the retrieving operation. When the retrieved results can be satisfied, processing of the information retrieving apparatus is terminated. In contrast to this, when no retrieved results can be satisfied, the retrieving period is extended to perform the retrieving operation in a step S67. Thus, the retrieving operation is again performed.

Accordingly, a retrieving success percentage is improved by widening the range of a date which tends to be inaccurately provided.

An embodiment of an information retrieving apparatus having an eleventh construction of the present invention will next be explained. An object of this embodiment is to provide an information retrieving apparatus for accurately determining a retrieving range on the basis of man's characteristics in which a man's memory is more accurate at a time closer to the present time and is more inaccurate at a time remoter from the present time.

There are many cases in which a man's memory is more accurate at a time closer to the present time and is more inaccurate at a time remoter from the present time. Therefore, a time difference from the present time is calculated in extension of each of starting and ending ranges of a retrieving period and an extending amount is controlled in accordance with this difference. For example, a period amount proportional to the difference from the present time is extended in an example shown in FIG. 20. In this example, each of positive constants K1 and K2 is set to 0.5 and a retrieving date is set to Nov. 1, 1993 and the retrieving period ranges from Nov. 1, 1989 to Oct. 31, 1991 in a step S71. In this case, the retrieving period is started from four years ago so that an extended retrieving period is started from six years ago by adding two years provided by multiplying the four years by 0.5. Further, the retrieving period is terminated two years ago so that the extended retrieving period is terminated one year ago by multiplying the two years by 0.5 and subtracting this multiplied number (one year) from the two years. Thus, the extended retrieving period is set to range from Nov. 1, 1987 to Oct. 31, 1992 in a step S72.

For example, as shown in FIG. 21, the present date is displayed in the display section 37 and the information retrieving apparatus asks a user a retrieving item. When the user inputs commands about image/processing/chip, the information retrieving apparatus asks the user the period of a material. When autumn last year is then inputted, the autumn last year is converted to a date of the Christian Era by the date interpreting section 32 on the basis of a rule stored to the interpreting rule memory 33. A retrieving operation is then performed and retrieved results are displayed in the display section 37. When no corresponding material can be found, the information retrieving apparatus asks the user whether the retrieving period is extended or not. When the retrieving period is extended, the retrieving period is extended as in the above steps S71 and S72 so that the retrieving operation is again performed for the extended retrieving period. When the corresponding material is found, it is confirmed whether the retrieved results are preferable or not. Thereafter, processing of the information retrieving apparatus is terminated.

Accordingly, it is possible to perform a retrieving operation suitable for man's characteristics in which a man's memory is more accurate at a time closer to the present time and is more inaccurate at a time remoter from the present time.

In accordance with the first construction of an information retrieving apparatus in the present invention, time and labor for making a security data base by predicting an inquirer in advance can be omitted.

In accordance with the second construction of the information retrieving apparatus, time and labor for making a security data base by predicting an inquirer in advance can be omitted.

In accordance with the third construction of the information retrieving apparatus, time and labor for making a security data base by predicting an inquirer in advance can be omitted.

In accordance with the fourth construction of the information retrieving apparatus, a security level suitable for the inquirer is registered to the security data base by only allowing transmission of retrieved results without registering this security level to the security data base in advance.

In accordance with the fifth construction of the information retrieving apparatus, using efficiency of the information retrieving apparatus can be improved. Further, no unnecessary retrieved results are transmitted so that utilizing efficiency of a network is improved.

In accordance with the sixth construction of the information retrieving apparatus, it is possible to automatically cancel a retrieving request in which no reply is obtained if a predetermined number of replies can be obtained.

In accordance with the seventh construction of the information retrieving apparatus, the retrieving request is issued by shifting retrieving times from each other so that overlapping retrievals can be reduced to the utmost.

In accordance with the eighth construction of the information retrieving apparatus, the retrieving request is issued by designating a retrieving effective time. Accordingly, the information retrieving apparatus can be set such that no retrieving operation is performed with respect to the retrieving request already meaningless after the effective time has passed.

In accordance with the ninth construction of the information retrieving apparatus, a relative date can be designated so that operability of the information retrieving apparatus is further improved.

In accordance with the tenth construction of the information retrieving apparatus, the range of a date tending to be inaccurately provided is widened so that a retrieving success percentage of the information retrieving apparatus is improved.

In accordance with the eleventh construction of the information retrieving apparatus, it is possible to perform a retrieving operation suitable for man's characteristics in which a man's memory is more accurate at a time closer to the present time and is more inaccurate at a time remoter from the present time.

Many widely different embodiments of the present invention may be constructed without departing from the spirit and scope of the present invention. It should be understood that the present invention is not limited to the specific embodiments described in the specification, except as defined in the appended claims.

What is claimed is:

1. An information retrieving apparatus comprising:

data memory means for holding data and security levels corresponding to each of said data;

data base means for registering identification information on inquirers and security levels assigned to each of the inquirers;

receiving/transmitting means for receiving a retrieving request from an inquirer with identification information on the inquirer and for transmitting a result corresponding to said retrieving request;

retrieving means for retrieving data from said data memory means in accordance with said retrieving request;

judging means for judging whether the retrieved result should be transmitted through said receiving/transmitting means by comparing the security level corresponding to data in the retrieved result with the security level assigned to the inquirer; and input/display means for displaying the retrieving request and the identification information on the inquirer and for inputting an instruction whether a security level should be assigned to the inquirer, when the security level is not assigned to the inquirer, wherein a security level is newly registered in said data base means at the time when the instruction to assign a security level to the inquirer is inputted.

2. An information retrieving apparatus as claimed in claim 1, wherein said information retrieving apparatus further comprises:

buffer means for temporarily storing the retrieved result when the security level assigned to the inquirer is equal to or higher than the security level of the retrieved result and said receiving/transmitting means communicates said retrieving request and the retrieved result through a network.

3. An information retrieving apparatus comprising:

data memory for holding data and security levels corresponding to each of said data;

data base means for storing identification information on inquirers and security levels assigned to each of the inquirers;

receiving/transmitting means for receiving a retrieving request from an inquirer with identification information on the inquirer and transmitting a result corresponding to said retrieving request through a network;

retrieving means for retrieving data from said data memory in accordance with said retrieving request;

judging means for judging whether the retrieved result should be transmitted through said receiving/transmitting means by comparing the security level corresponding to data in the retrieved result with the security level assigned to the inquirer; and input/display means for displaying the retrieving request and the identification information on the inquirer and for inputting an instruction whether the retrieved result should be transmitted to the inquirer, when the security level corresponding to data in the retrieved result is higher than the security level assigned to the inquirer, said receiving/transmitting means transmits the retrieved result to the inquirer when the instruction to transmit the retrieved result is inputted.

4. An information retrieving apparatus as claimed in claim 3, wherein said input/display means updates the security level of the inquirer to be equal to the security level corresponding to data in the retrieved result and registers the updated security level to the data base means when the instruction to transmit the retrieved result is inputted.

5. An information retrieving system including a plurality of terminal units connected to a network, each of said terminal units comprising:

storage means for storing data;

receiving/transmitting means for receiving/transmitting information from/to the other terminal units, said information including a retrieving request and a result corresponding to said retrieving request;

retrieving means for retrieving data from said storage means in accordance with the retrieving request from another terminal unit;

requiring means for transmitting a canceling request to each of the other terminal units from which the retrieved result is not received, after judgment that the retrieved result previously received from one of the other terminal units satisfies a predetermined condition; and canceling means for terminating retrieving request received from another terminal unit when said canceling request is received.

6. An information retrieving system as claimed in claim 5, wherein said predetermined condition includes a predetermined number of replies.

7. An information retrieving system as claimed in claim 5, wherein each of said terminal units further comprises:

setting means for setting a starting time of retrieval; and timer means for delaying said retrieval until the starting time set by said setting means.

8. An information retrieving system as claimed in claim 7, wherein starting times of retrieval with respect to the terminal units are shifted from each other.

9. An information retrieving system as claimed in claim 5, wherein each of said terminal units further comprises time means for setting a time limit for the retrieving request; and said canceling means terminates said retrieving request when said retrieving request is received after said time limit has elapsed.

10. An information retrieving system as claimed in claim 5, wherein each of said terminal units further comprises input means for inputting retrieval/question contents and display means for displaying an inputting situation, a retrieving situation, the retrieved results.

11. An information retrieving system as claimed in claim 10, wherein each of said terminal units further comprises input buffer means for temporarily holding the retrieving request.

12. An information retrieving apparatus comprising:

input means for inputting a retrieving request;

rule memory means for storing a rule for interpreting each of terminology used in a relative date expression such as "yesterday", "tomorrow", "a few days ago";

interpreting means for interpreting the relative date expression in said retrieving request by converting it into the absolute date expression on the basis of the rule stored in said rule memory means and the present date;

data memory means for holding data;

retrieving means for retrieving data from said data memory in accordance with the retrieving request;

buffer means for temporarily holding the retrieved result; and display means for displaying said retrieved result.

13. An information retrieving apparatus as claimed in claim 12, wherein said information retrieving apparatus further comprises extending means for extending a retrieving period in the retrieving request.

14. An information retrieving apparatus as claimed in claim 13, wherein said extending means extends said retrieving period on the basis of a date difference from the present date.

15. An information retrieving apparatus as claimed in claim 12, wherein a retrieving period is extended and the retrieving operation is again performed for the extended retrieving period when no retrieved results are satisfied.

16. An information retrieving apparatus as claimed in claim 15, wherein the retrieving period is extended by using a predetermined calculating formula.

17. An information retrieving apparatus as claimed in claim 12, wherein the interpreting means interprets the relative date by converting this relative date to a date of the Christian Era.

* * * * *